United States Patent
Fladhammer et al.

(10) Patent No.: US 10,793,058 B2
(45) Date of Patent: Oct. 6, 2020

(54) CLUTCHING LAMP ADJUSTER

(71) Applicant: Asyst Technologies, LLC, Kenosha, WI (US)

(72) Inventors: Scott T. Fladhammer, Caledonia, WI (US); Michael B. Grimm, Antioch, IL (US)

(73) Assignee: Asyst Technologies, LLC, Kenosha, WI (US)

( * ) Notice: Subject to any disclaimer, the term of this patent is extended or adjusted under 35 U.S.C. 154(b) by 0 days.

(21) Appl. No.: 16/506,638

(22) Filed: Jul. 9, 2019

(65) Prior Publication Data

US 2020/0017019 A1    Jan. 16, 2020

Related U.S. Application Data

(60) Provisional application No. 62/697,853, filed on Jul. 13, 2018.

(51) Int. Cl.
*B60Q 1/068* (2006.01)
*F16H 35/18* (2006.01)
*F16H 25/20* (2006.01)
*B60Q 1/076* (2006.01)

(52) U.S. Cl.
CPC ........... *B60Q 1/0683* (2013.01); *B60Q 1/076* (2013.01); *F16H 25/20* (2013.01); *F16H 35/18* (2013.01)

(58) Field of Classification Search
CPC ....... B60Q 1/0683; B60Q 1/076; F16H 35/18; F16H 25/20
See application file for complete search history.

(56) References Cited

U.S. PATENT DOCUMENTS

| | | | | |
|---|---|---|---|---|
| 5,063,481 A | * | 11/1991 | Martin | B60Q 1/0683 362/419 |
| 5,258,894 A | * | 11/1993 | Bivens | B60Q 1/0683 362/273 |
| 5,526,238 A | | 6/1996 | Ford | |
| 5,546,283 A | | 8/1996 | Koito | |
| 5,678,915 A | | 10/1997 | Shirai et al. | |
| 5,746,559 A | | 5/1998 | Koito | |
| 10,093,221 B2 | * | 10/2018 | Burton | F16B 5/0241 |

(Continued)

FOREIGN PATENT DOCUMENTS

| | | |
|---|---|---|
| GB | 2285307 | 7/1995 |
| JP | H08115604 | 11/2005 |
| WO | 2009076438 | 6/2009 |

OTHER PUBLICATIONS

Search report for European Application No. 19185561.8 dated Jan. 22, 2020.

*Primary Examiner* — Donald L Raleigh
(74) *Attorney, Agent, or Firm* — James Joyce; Godfrey & Kahn, S.C.

(57) ABSTRACT

An adjuster adjusts the position of a fog lamp, headlamp, or other form of adjustable, automotive lamp. The adjuster includes a side-opening retainer screw interface. The side-opening retainer allows the adjuster to provide clutching throughout travel. In addition, a distal end of the retainer includes a set of retainer snap fingers and a separate set of spring fingers. The snap fingers and spring fingers allow for a strong, elastic connection to a lamp mating panel and allow the retainer to securely connect to lamp mating panels of various thicknesses.

20 Claims, 28 Drawing Sheets

(56) References Cited

U.S. PATENT DOCUMENTS

2011/0032716 A1\* 2/2011 Burton ................ B60Q 1/0683
362/460
2013/0141930 A1 6/2013 Inaba
2015/0017662 A1 1/2015 Hah et al.

\* cited by examiner

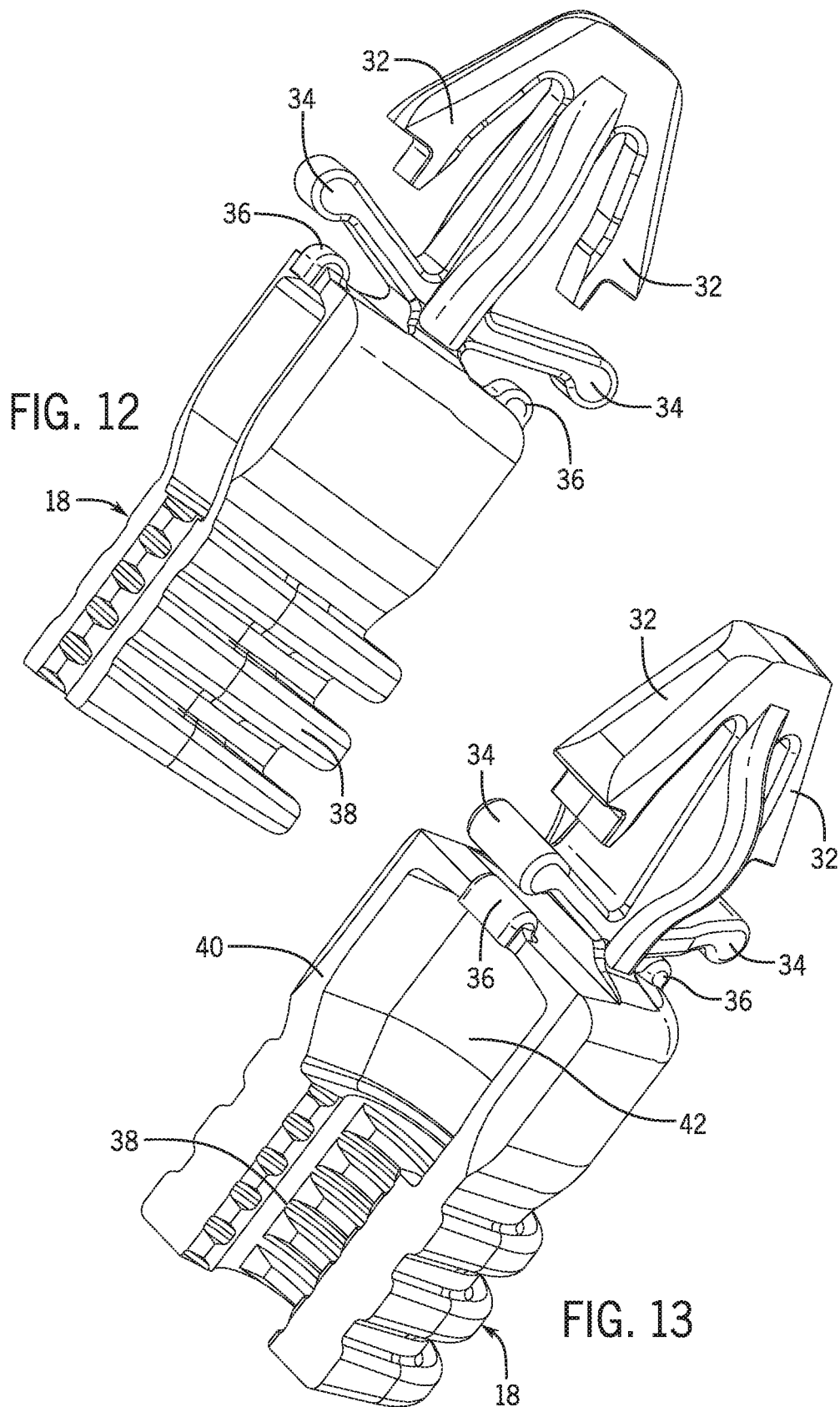

CLUTCHING LAMP ADJUSTER

PRIORITY CLAIM AND CROSS-REFERENCE TO RELATED APPLICATION

This application is based on and claims priority to U.S. Provisional Patent Application No. 62/697,853 filed on Jul. 13, 2018, which is incorporated herein by reference in its entirety for all purposes.

FIELD OF THE INVENTION

The present invention relates generally to the field of adjusters. More particularly, the present invention relates to an adjuster for fog lamps, headlamps, and other forms of adjustable automotive lamps that allows clutching throughout travel.

BACKGROUND

It is common, in automobiles, to use internal adjusters to adjust the position of certain automotive lamps, such as fog lamps or headlamps. Such internal adjusters include multiple parts and can easily grow complex. Hence, simplicity is an important facet when designing an adjuster. Additionally, lamp adjusters are often required to absorb high levels of system vibration, which can cause unwanted reorientation of the adjuster, damage to adjuster components, such as through stripping, and even, in some instances, disengagement of the adjuster. Therefore, it is valuable for an adjuster to be configured to maintain its orientation while undergoing system vibrations and to form a mating connection that is elastic enough to absorb vibrations without disengagement of or damage to either mated component. It may further be valuable for an adjuster to provide clutching throughout travel to eliminate stripping damage, especially in situations where it is required to accommodate higher system weights or operating temperatures.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

SUMMARY

In certain aspects, the present invention provides an adjuster for adjusting automotive lamps. In accordance with some forms of the invention such adjuster includes a retainer and a base screw configured in a manner that permits clutching throughout travel. Accordingly, in one embodiment, the present invention provides an adjuster for adjustable automotive lamps. The adjuster comprises a base screw and a retainer. The base screw includes a threaded shaft. The retainer connects to the threaded shaft and includes a semicircular sidewall, a plurality of retainer snap fingers, and a plurality of retainer spring fingers. The semicircular sidewall includes interior threads that correlate to the threads of the threaded shaft. The semicircular sidewall further surrounds at least a portion of the threaded shaft and defines a clutching opening. The clutching opening permits expansion of the semicircular sidewall when the threaded shaft slips with respect to the interior threads. The retainer snap fingers are located proximate to a distal end of the retainer and are configured to mate to a lamp mating portion of the adjustable automotive lamp. The retainer spring fingers are positioned within such proximity to the retainer snap fingers as to further secure the lamp mating portion against substantial sliding movement along the adjuster after the retainer snap fingers mate with the lamp mating portion.

In another embodiment, the invention provides an adjuster assembly for adjustable automotive lamps. The adjuster assembly comprises a housing mating portion connected to a lamp housing, a lamp mating portion forming part of the adjustable automotive lamp, and a lamp adjuster connected to both the housing mating portion and the lamp mating portion. The lamp adjuster comprises a base screw and a retainer. The base screw includes a threaded shaft. The retainer connects to the threaded shaft and includes a semicircular sidewall, a plurality of retainer snap fingers, and a plurality of retainer spring fingers. The semicircular sidewall includes interior threads that correlate to the threads of the threaded shaft. The semicircular sidewall further surrounds at least a portion of the threaded shaft and defines a clutching opening. The clutching opening permits expansion of the semicircular sidewall when the threaded shaft slips with respect to the interior threads. The retainer snap fingers are located proximate to a distal end of the retainer and are configured to mate to a lamp mating portion of the adjustable automotive lamp. The retainer spring fingers are positioned within such proximity to the retainer snap fingers as to further secure the lamp mating portion against substantial sliding movement along the adjuster after the retainer snap fingers mate with the lamp mating portion.

In a further embodiment, the invention provides a lamp adjuster for adjustable automotive lamps. The lamp adjuster includes a base screw and a retainer. The base screw has a threaded shaft and a plurality of base screw snap fingers configured to mate to a housing mating portion of a lamp housing in a manner that permits rotation of the base screw with respect the housing mating portion. The base screw also has a securement mechanism configured to secure the housing mating portion against substantial longitudinal movement after the plurality of snap fingers mates with the housing mating portion and an orientation tab located on a distal end of the base screw. The orientation tab is configured to signal proper orientation of the lamp adjuster to a user installing the lamp adjuster. The retainer connects to the threaded shaft of the base screw and includes a semicircular sidewall, a pair of opposing retainer snap fingers, a pair of opposing retainer spring fingers. The sidewall partially surrounds at least a portion of the threaded shaft and has a series of interior threads that correlate to the threads of the threaded shaft. Additionally, the semicircular sidewall defines a clutching opening that permits expansion of the semicircular sidewall when the threaded shaft slips with respect to the interior threads. The pair of retainer snap fingers are located proximate to a distal end of the retainer and are configured to mate to a lamp mating panel of an automotive lamp heat sink in a manner that fixes the retainer against rotation. The pair of opposing retainer spring fingers are positioned within such proximity to the plurality of retainer snap fingers as to secure the lamp mating portion against substantial longitudinal movement along the length of the adjuster after the plurality of snap fingers mates with the lamp mating portion.

Other objects and advantages of the present disclosure will become apparent hereinafter.

BRIEF DESCRIPTION OF THE DRAWINGS

FIG. 12 is a perspective view of the retainer of the clutching lamp adjuster shown in FIG. 2;

FIG. 13 is a rotated perspective view of the retainer shown in FIG. 12;

DETAILED DESCRIPTION OF THE PREFERRED EMBODIMENTS

While the description herein refers mainly to fog lamps, the term "fog lamp," as used in this application, can be applied equally well to other adjustable lamps, such as headlamps. References to fog lamps hereinafter should not be read as limiting the device for use solely with fog lamps.

Figure 1:
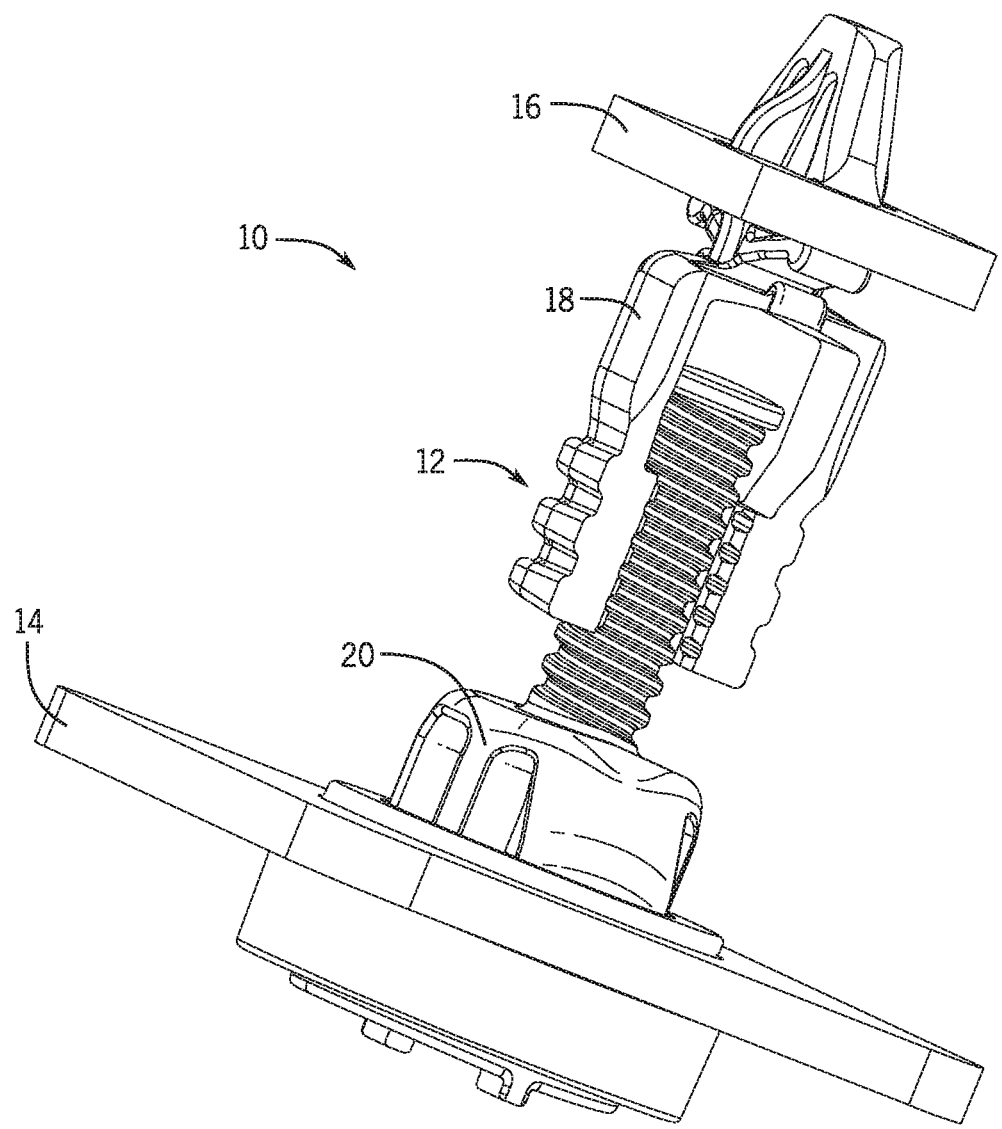
FIG. 1 is a perspective view of a clutching lamp adjuster assembly including a clutching lamp adjuster, a housing mating portion, and a lamp mating panel according to one embodiment of the present disclosure.
Figure 2:
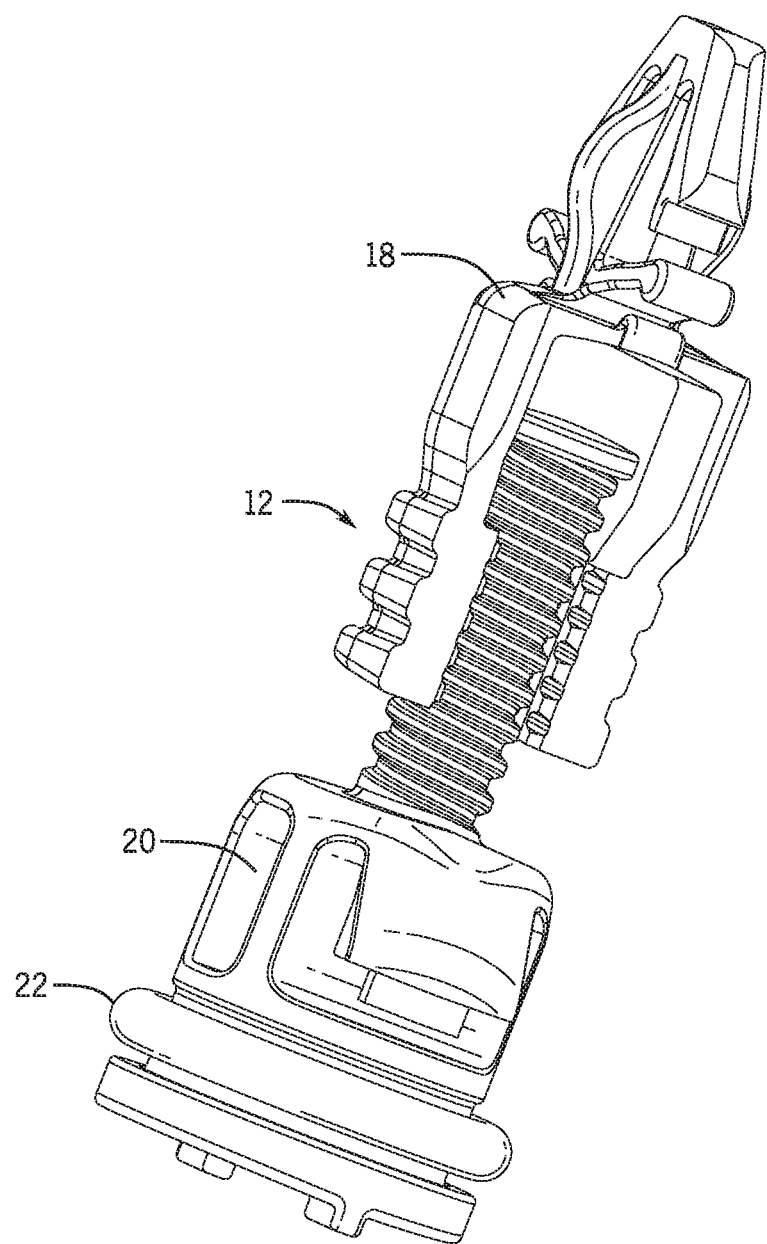
FIG. 2 is a perspective view of the clutching lamp adjuster of the clutching lamp adjuster assembly of FIG. 1 including a base screw, an O-Ring, and a retainer.

FIG. 1 shows one embodiment of a clutching fog lamp adjuster assembly 10. In the embodiment shown, the adjuster assembly 10 includes a clutching fog lamp adjuster 12, a housing mating portion 14, and a lamp mating panel 16. The housing mating portion 14 may form a portion of a broader lamp housing, and the lamp mating panel 16 may form a portion of a broader lamp heat sink (not shown), but for convenience and clarity, the remainder of the housing and of the lamp heat sink are omitted from the drawings of this embodiment. In the present embodiment, the adjuster 12 includes a base screw 20, a retainer 18 that screws or snaps onto the base screw 20, and an O-Ring 22 that wraps around a portion of the base screw 20 (see FIG. 2). In this embodiment, the adjuster 12 mates with the housing mating portion 14 at a housing mating end, and with the lamp mating panel 16 at an opposing, retainer mating end. FIG. 2 shows the adjuster 12 in greater detail. With the housing mating portion 14 and the lamp mating panel 16 removed, the O-Ring 22 is now visible.

Figure 3:
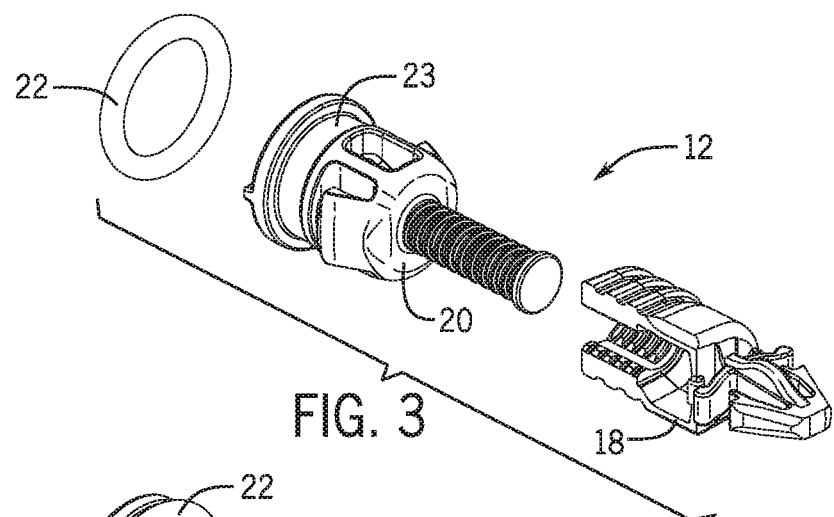
FIG. 3 is an exploded side perspective view of the clutching lamp adjuster of FIG. 2.
Figure 4:
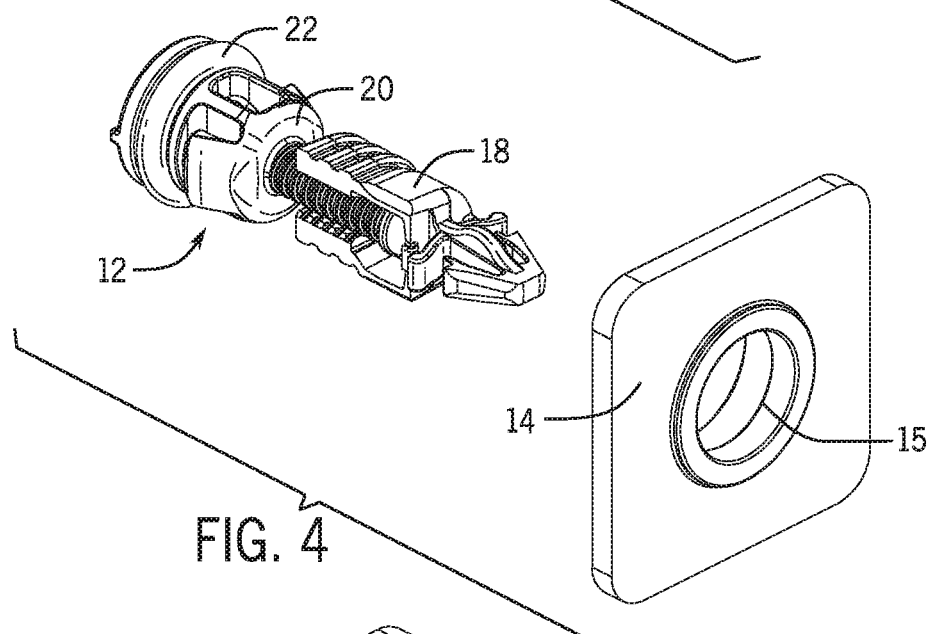
FIG. 4 is an exploded side perspective view of the clutching lamp adjuster assembly of FIG. 1 with the lamp mating panel removed for clarity, showing the clutching lamp adjuster as an assembled unit, and the housing mating portion, as a separate element, still to be assembled.

FIGS. 3-6 show one manner of assembling the adjuster assembly 10. FIG. 3 is an exploded view of the adjuster 12. In the embodiment shown, the base screw 20 includes an O-Ring channel 23 near the housing mating end of the adjuster 12. The O-Ring channel 23 allows for proper positioning of the O-Ring 22 and aids in maintain the position of the O-Ring 22 at the housing mating end of the base screw 20. FIG. 4 shows the adjuster 12 fully assembled before being mated with the housing mating portion 14. Here, the O-Ring 22 is positioned in the O-Ring channel 23, and the retainer 18 is snapped onto the base screw 20.

Figure 5:
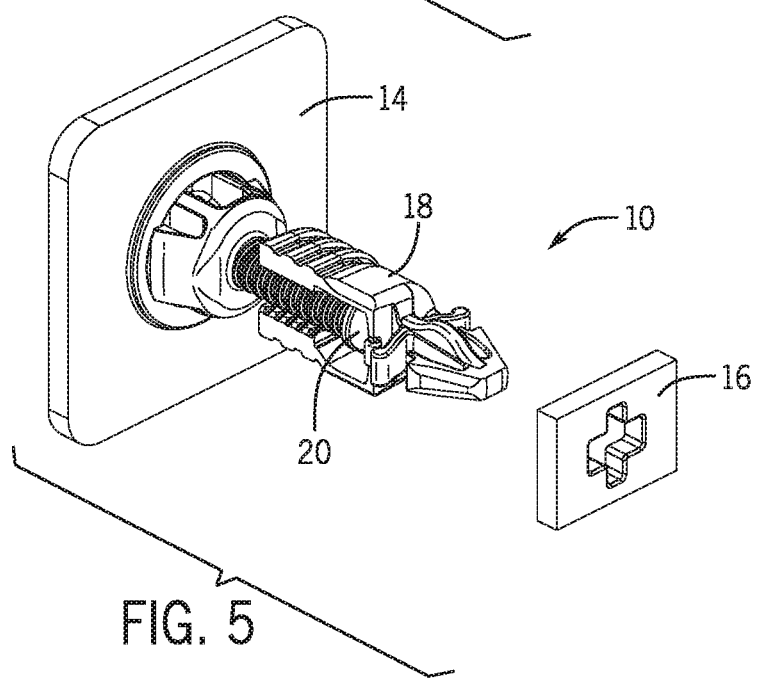
FIG. 5 is an exploded side perspective view of the clutching lamp adjuster assembly of FIG. 1 showing the clutching lamp adjuster and the housing mating portion together as an assembled unit, and the mating panel, as a separate element, still to be assembled.

A ridged sidewall 15 defines an opening in the housing mating portion 14, sized to permit the adjuster 12 to pass through the opening, beginning at the retainer mating end, until the opposing housing mating end is reached. At the housing mating end, the base screw 20 snaps into place against the ridged sidewall 15, such that the base screw 20 may no longer move in a forward or a rearward direction through the housing mating portion 14, but may still rotate within the opening defined by the ridged sidewall 15. Although the ridged sidewall 15, in this embodiment, forms a substantially circular shape, the ridged sidewall in other embodiments may form other shapes, corresponding to other mating ends of other base screws. In this embodiment, after the adjuster 12 is mated with the housing mating portion 14, the O-Ring 22 may act as a seal, may aid in isolating vibrations, and/or may help to secure the connection between the base screw 20 and the housing mating portion 14. Other embodiments, such as the embodiment shown in FIGS. 23-46, may operate without an O-Ring. FIG. 5 shows the adjuster 12 mated with the housing mating portion 14, separated from the lamp mating panel 16. When fully assembled, the lamp mating panel 16 snaps into place at the retainer mating end of the adjuster 12.

Figure 6:
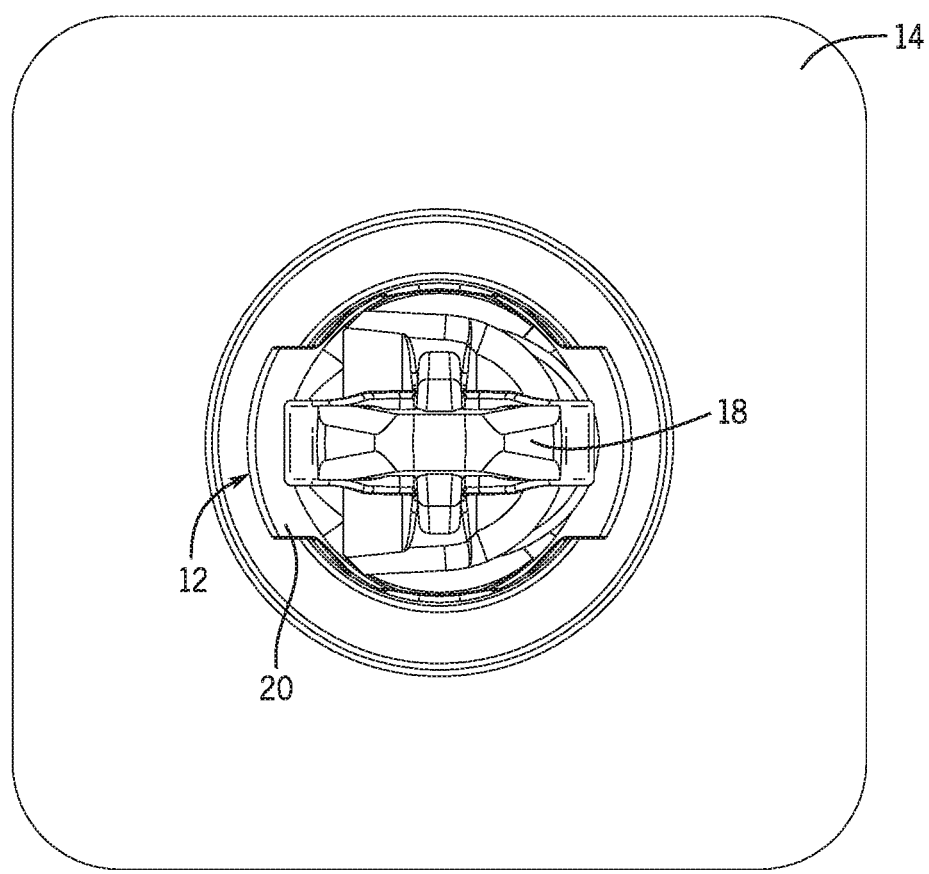
FIG. 6 is a top view of the clutching lamp adjuster assembly of FIG. 1 with the lamp mating panel not shown.
Figure 7:
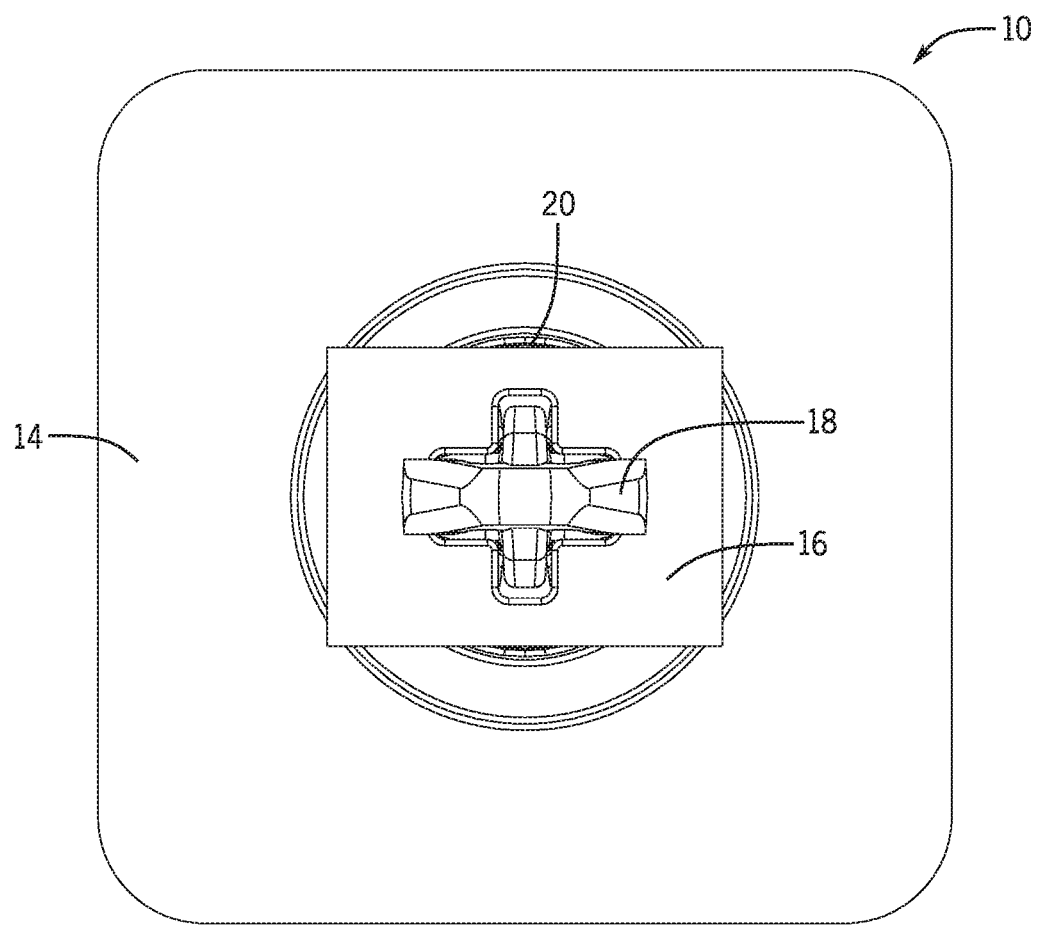
FIG. 7 is a top view of the clutching lamp adjuster assembly of FIG. 1.
Figure 8:
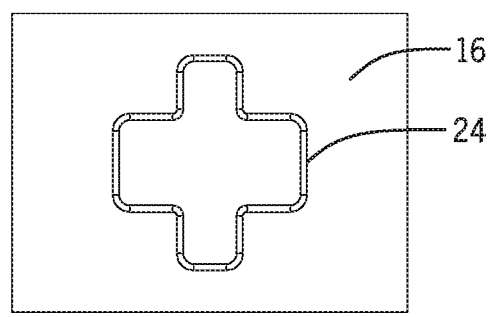
FIG. 8 is a top view of the lamp mating panel of the clutching lamp adjuster assembly of FIG. 1.

FIGS. 6-8 show top views of various elements of the adjuster assembly 10. FIG. 6 shows the adjuster 12 mated with the housing mating portion 14. The lamp mating panel 16 is not shown. FIG. 7 shows the complete adjuster assembly 10. And FIG. 8 shows only the lamp mating panel 16. In this embodiment, the mating geometry 24 is formed in the shape of a plus symbol. In other embodiments, the mating geometry may form other shapes, corresponding to other mating ends of other adjusters.

Figure 9:
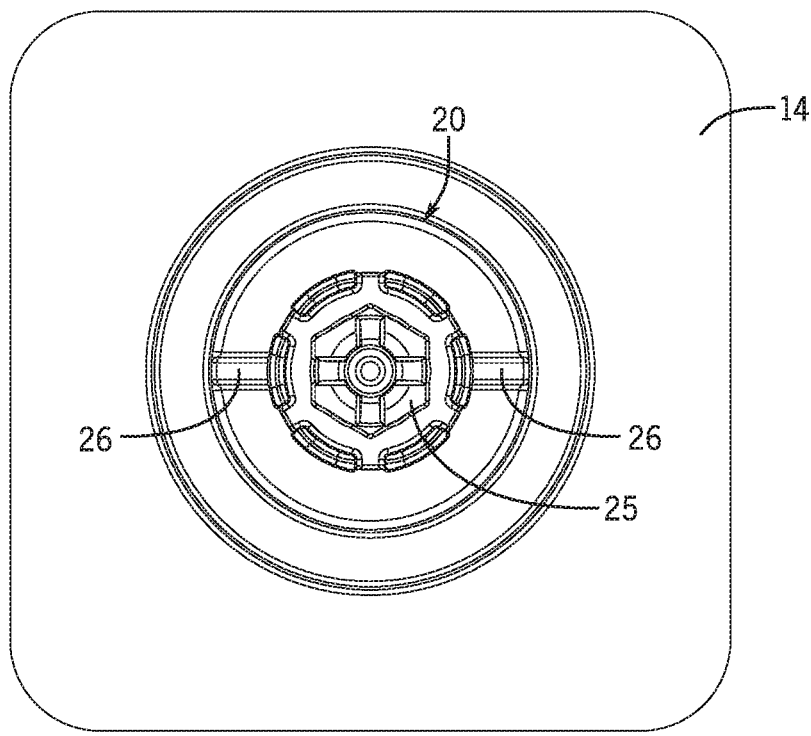
FIG. 9 is a bottom view of the clutching lamp adjuster assembly of FIG. 1.
Figure 10:
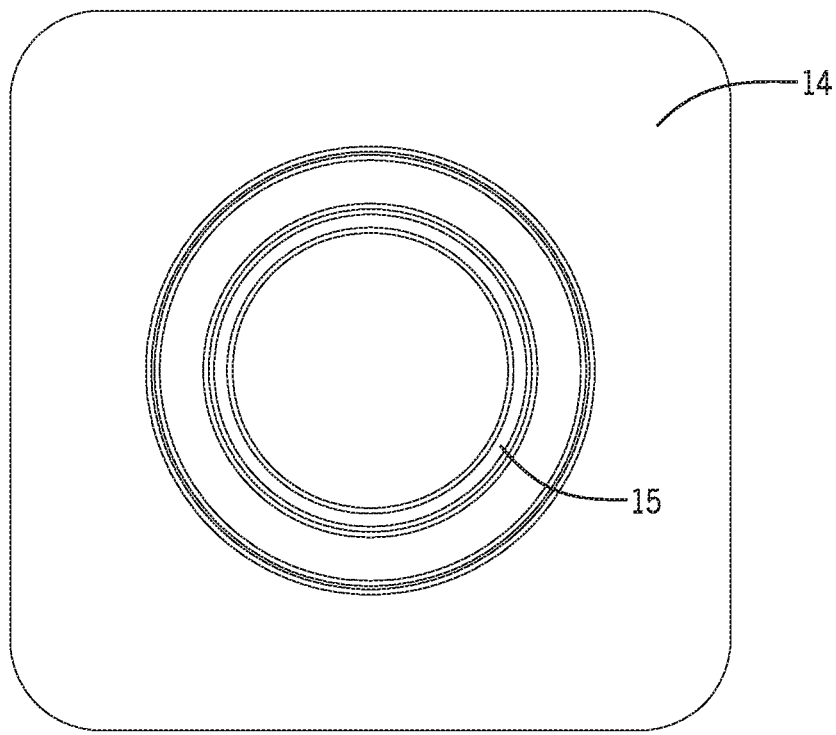
FIG. 10 is a bottom view of the housing mating portion of the clutching lamp adjuster assembly of FIG. 1.

FIGS. 9-10 respectively show bottom views of the adjuster assembly 10 and of the housing mating portion 14, alone. In the embodiment shown, a distal end of the base screw 20 includes a combination hexagonal-cross recessed interface 25, which allows for multiple component installation and adjustment options. However, in other embodiments, the distal end of the base screw 20 may include different forms of interfaces. In this embodiment, the distal end of the base screw 20 additionally includes orientation tabs 26. The orientation tabs 26 allow an assembler to correctly orient the adjuster 12, even when the assembler cannot see beyond the housing mating portion 14, for instance, during a blind assembly. The embodiment shown in FIG. 9 includes two orientation tabs 26, and proper installation is signaled by a horizontal orientation of the orientation tabs 26. However, in other embodiments, a different number of orientation tabs may be utilized and proper orientation of the adjuster 12 may be signaled by a different orientation of the orientation tabs 26. Further, FIG. 10 shows the ridged sidewall 15 extending continuously around the opening formed in housing mating portion 14. The continuity of the ridged sidewall 15 may permit rotation of the base screw 20 within the housing mating portion 14.

Figure 11:
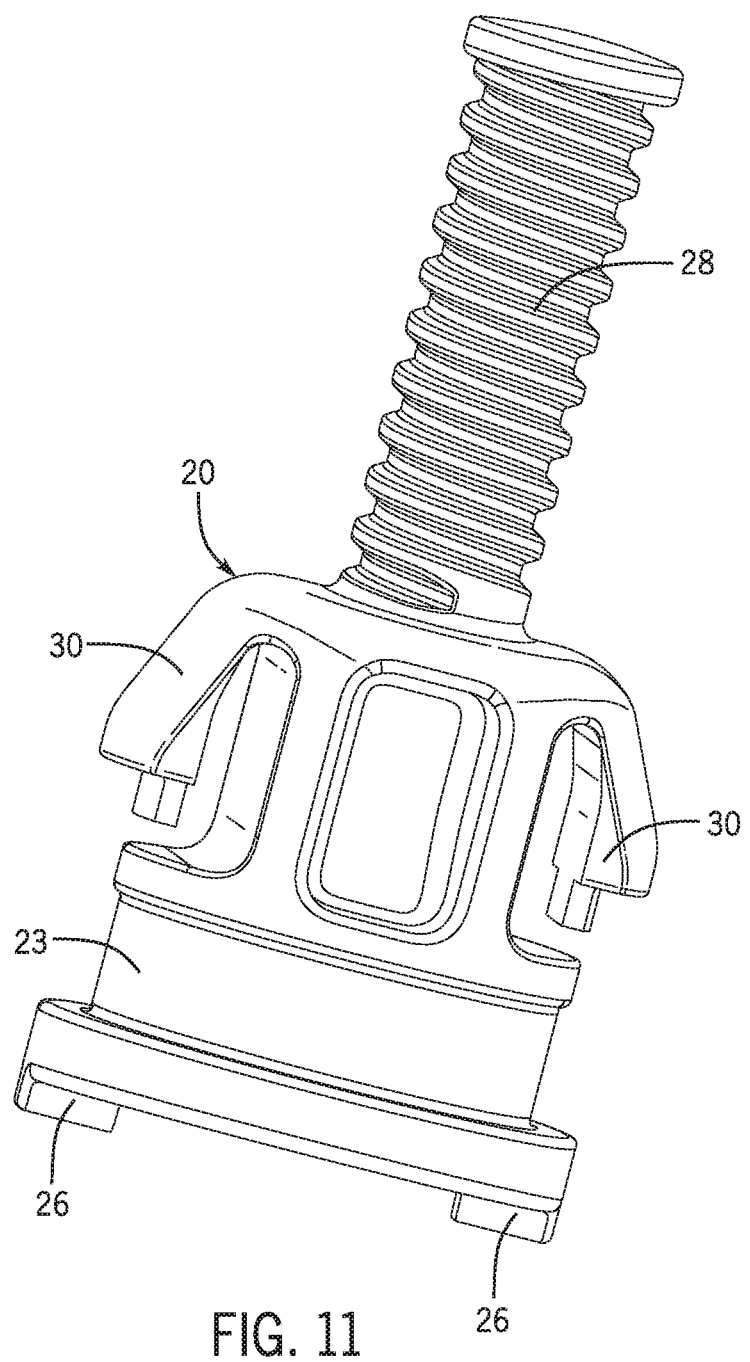
FIG. 11 is a perspective view of the base screw of the clutching lamp adjuster shown in FIG. 2.
Figure 14:
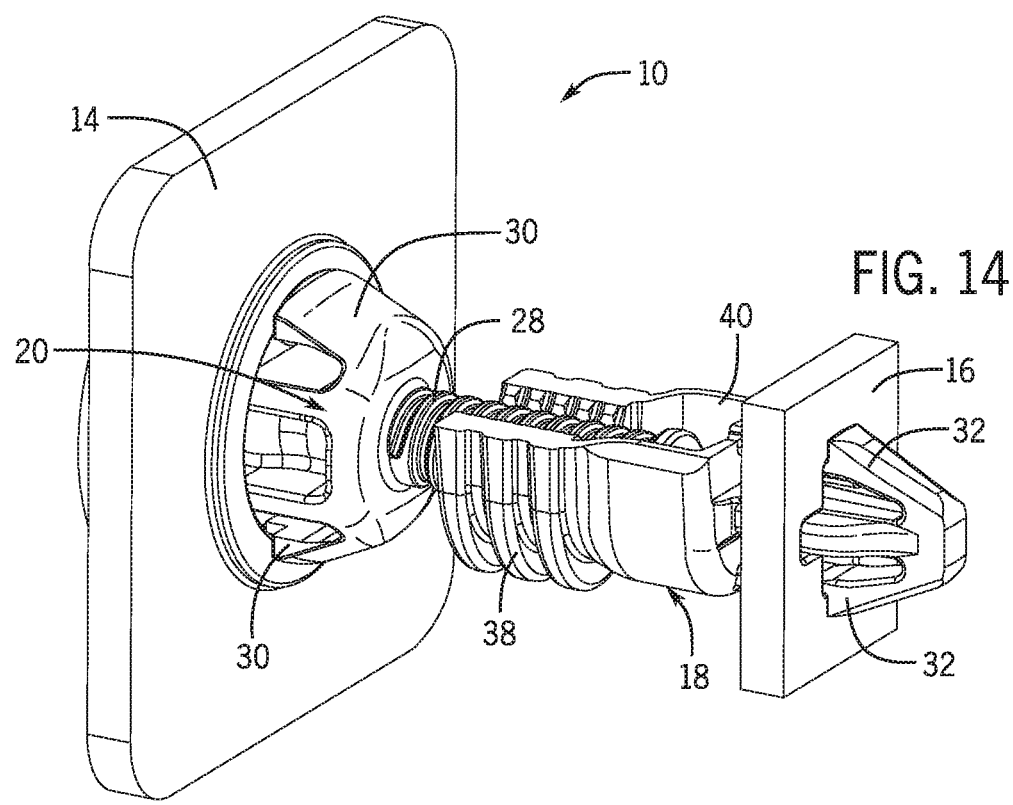
FIG. 14 is a front perspective view of the clutching lamp adjuster assembly of FIG. 1.

FIG. 11 shows the base screw 20 in greater detail. The base screw 20 may include base screw snap fingers 30 that snap into the ridged sidewall 15, contributing to a resilient, but rotatable mating connection with the housing mating portion 14. The base screw 20 may additionally include a threaded section 28, to which the retainer 18 connects.

FIGS. 12-13 show the retainer 18 in greater detail. The retainer 18 includes a semicircular retainer sidewall 40. In this embodiment, the retainer sidewall 40 defines a clutching opening 42. Additionally, a portion of the retainer sidewall 40 may be threaded to form a retainer interface section 38, where the retainer 18 may interact with the threaded section 28 of the base screw 20. The unique composition of the retainer sidewall 40 allows for clutching at any point throughout travel. When the base screw 20 rotates in a manner that would not otherwise be permitted by the retainer interface section 38, rather than stripping the threaded section 28, the retainer sidewall 40 expands, widening the clutching opening 42 to an extent sufficient to permit slippage of the base screw 20 along the base screw interface 38 without significant damage to the threads of the threaded section 28 until the threaded section 28 once again fits properly within the retainer interface section 38, but not so far as to permit the threaded section 28 to dislodge from the retainer interface section 38. Integrated full-travel clutching provides a more robust adjustment solution for systems having increased weight and/or temperatures.

The retainer 18 additionally includes retainer snap fingers 32 to engage the lamp mating panel 16 and retainer spring fingers 34 to secure the connection to the lamp mating panel 16. In the embodiment shown, there are two retainer snap fingers 32 and two retainer spring fingers 34, each retainer spring finger 34 located directly below a respective retainer snap finger 32. In other embodiments, there may be a greater number of retainer snap fingers 32 and/or retainer spring fingers 34. Direct engagement of the retainer 18 with the lamp mating panel 16 eliminates the need for installation of a secondary mating socket, simplifying assembly and reducing component count.

In this embodiment, both the retainer snap fingers 32 and the retainer spring fingers 34 are made of an elastic material. Securing the lamp mating panel 16 between multiple, elastic elements, versus a single element or small number of rigid elements, allows the adjuster assembly 10 both to withstand greater system vibrations with decreased likelihood of damage or dislodging, and to accommodate lamp mating panels, or equivalent lamp mating elements, of various thicknesses without requiring higher installation forces or creating a loose joint. Finally, a travel restriction lug 36 may be attached to the retainer sidewall 40 directly below each retainer spring finger 34. The travel restriction lug 36 limits the distance that the corresponding retainer spring finger 34 may be stretched during installation and general usage, reducing the risk of permanent spring finger deformation.

Figure 15:
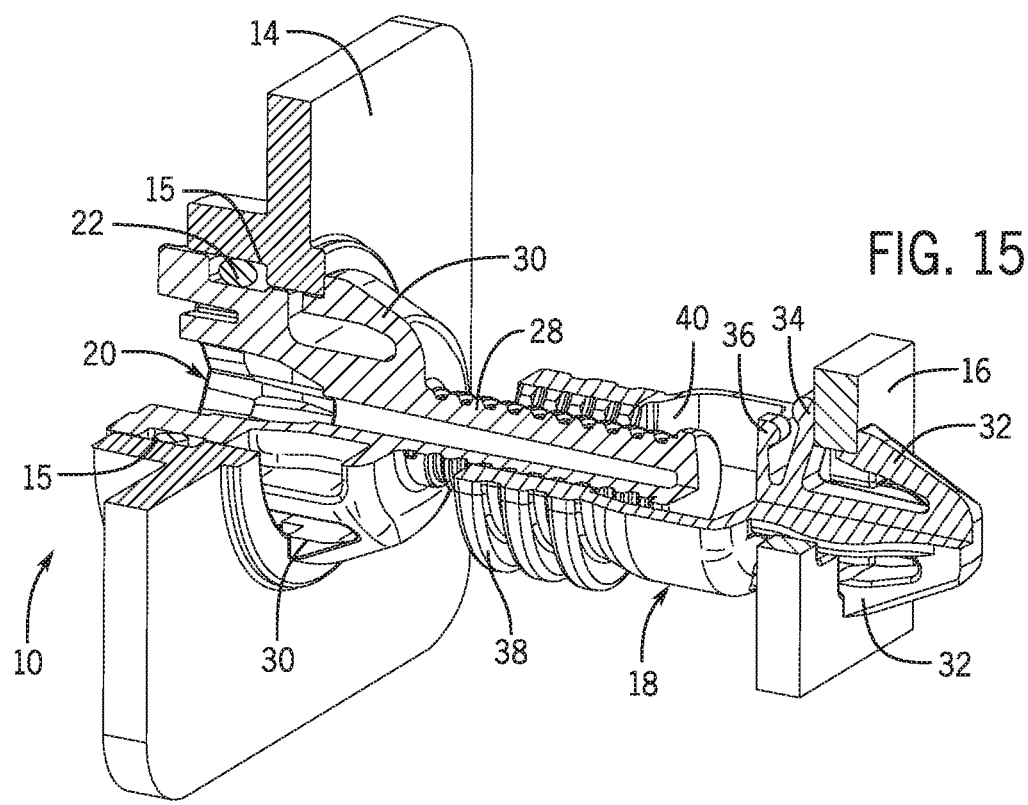
FIG. 15 is a front perspective cutaway view of the clutching lamp adjuster assembly of FIG. 14.
Figure 16:
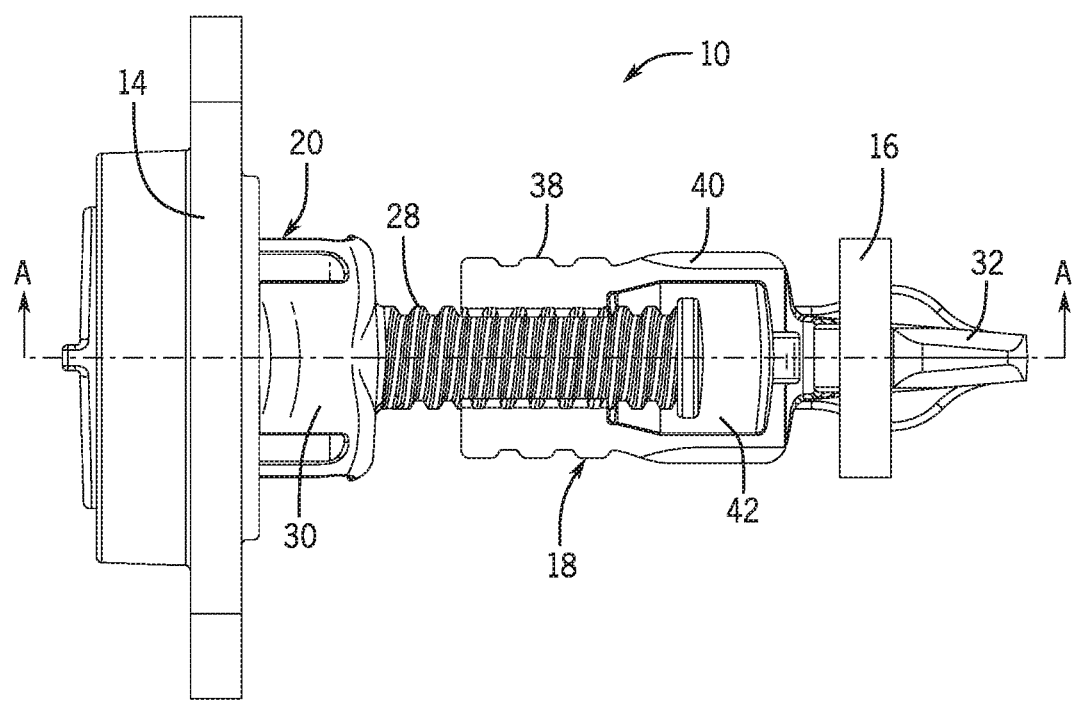
FIG. 16 is a side view of the clutching lamp adjuster assembly of FIG. 1.
Figure 17:
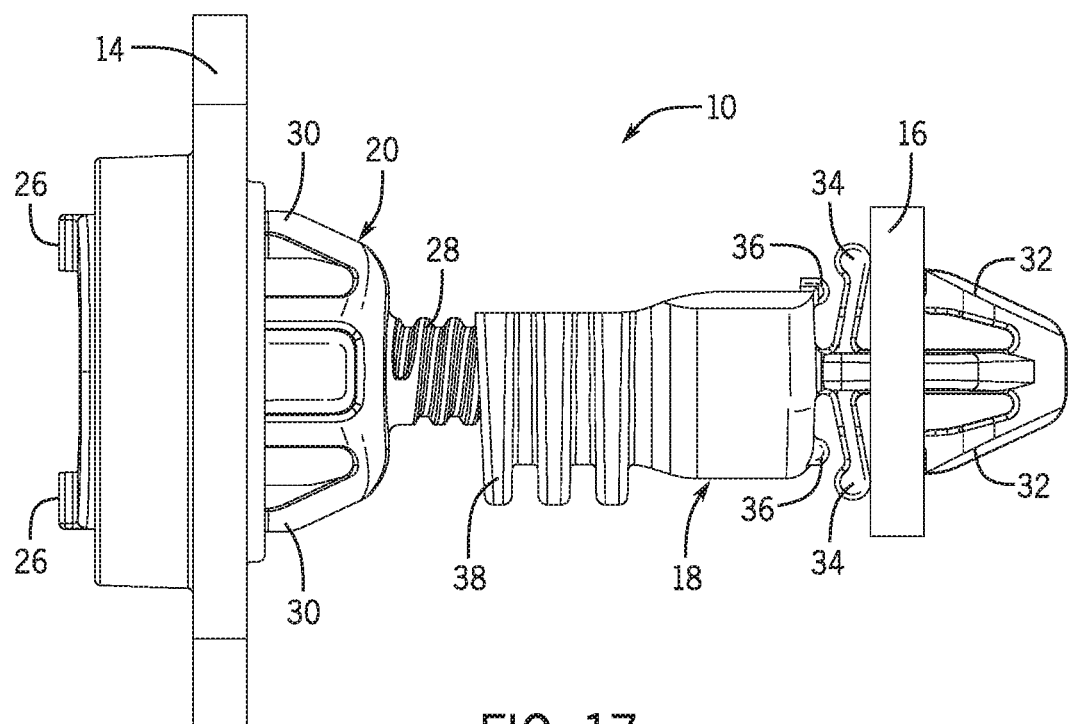
FIG. 17 is a front view of the clutching lamp adjuster assembly of FIG. 1.
Figure 18:
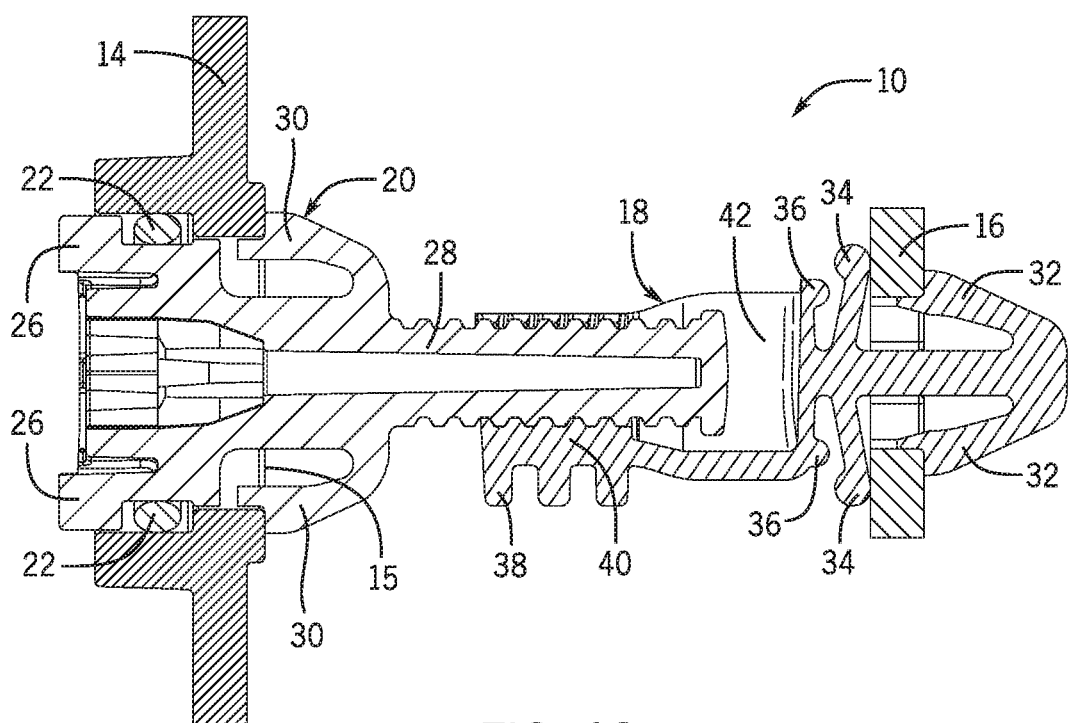
FIG. 18 is a cross-sectional front view of the clutching lamp adjuster assembly shown in FIG. 16, taken along the line A-A in FIG. 16.

FIGS. 14-18 show the various components of the full adjuster assembly 10 interacting with one another. For instance, the cutaway view in FIG. 15 shows the O-Ring 22 in place between the base screw 20 and the ridged sidewall 15, as well as showing the lamp mating panel 16 locked in place by the retainer snap fingers 32 and further secured by the retainer spring finger 34, also shown in the cross-sectional view in FIG. 18. Further, the custom fit of the retainer mating end within the mating geometry 24 (shown in FIG. 8) helps control insertion location, promoting proper retainer 18 orientation, and aids in limiting unwanted vibration. Additionally, the ability to connect the mating end of the retainer 18 directly to the lamp mating panel 16 of the lamp heat sink, due to the mating geometry 24 (shown in FIG. 8), eliminates the need for additional mating components, such as a secondary mating component, simplifying the adjuster assembly 10.

Figure 19:
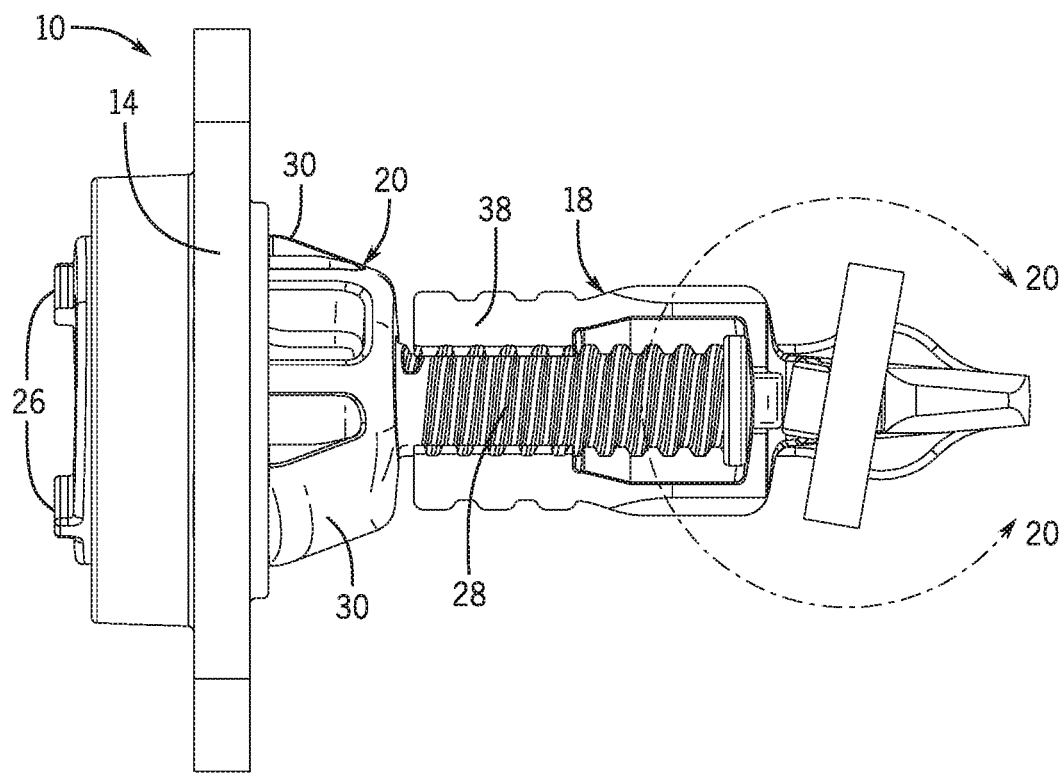
FIG. 19 is a side view of a portion of the clutching lamp adjuster assembly in a retracted position.
Figure 20:
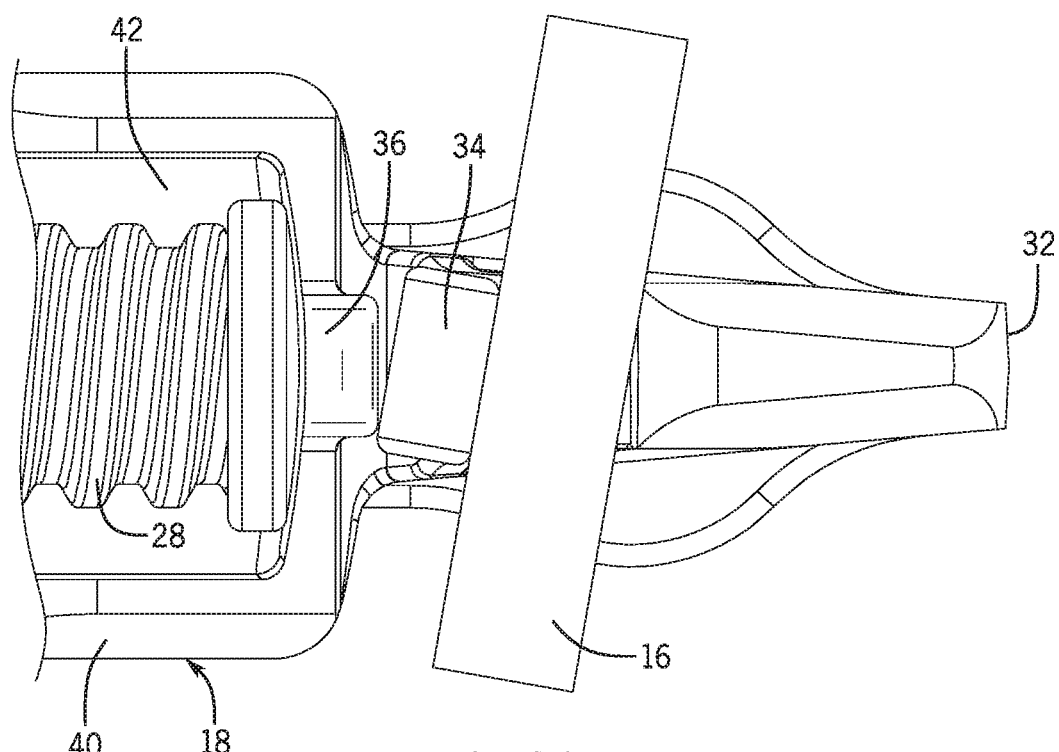
FIG. 20 is a detail side view of the clutching lamp adjuster assembly shown in FIG. 19 at the distal end of the retainer.
Figure 21:
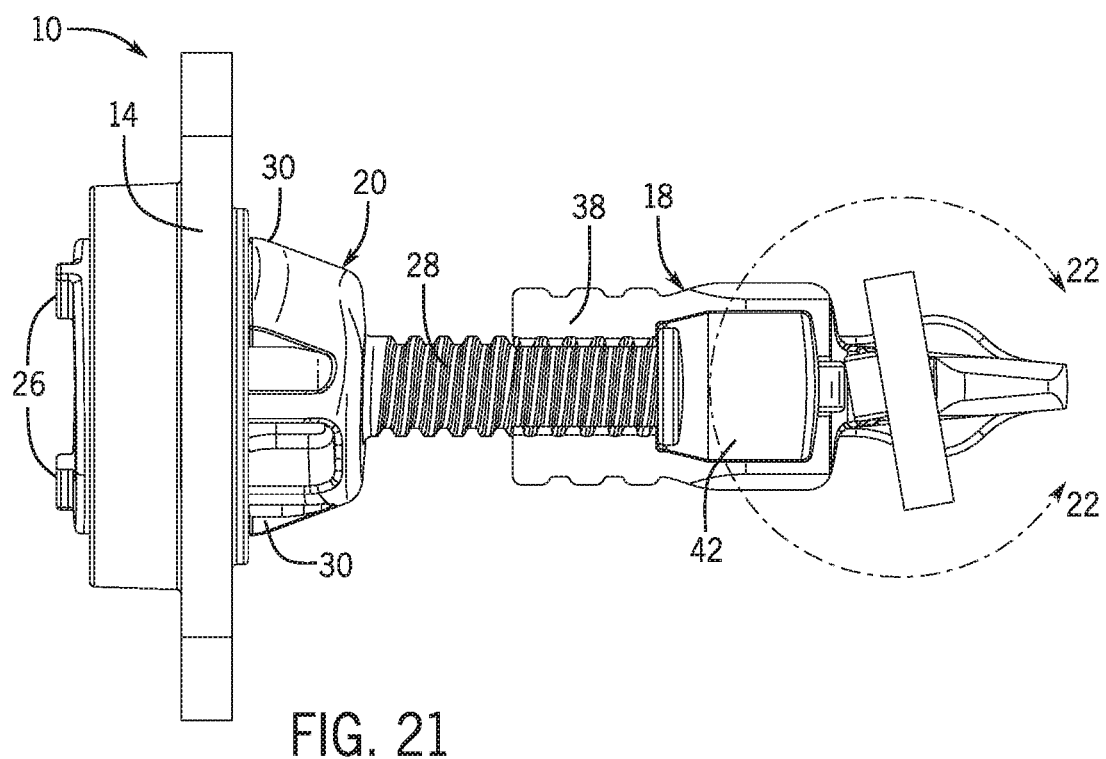
FIG. 21 is a side view of the clutching lamp adjuster assembly in an extended position.
Figure 22:
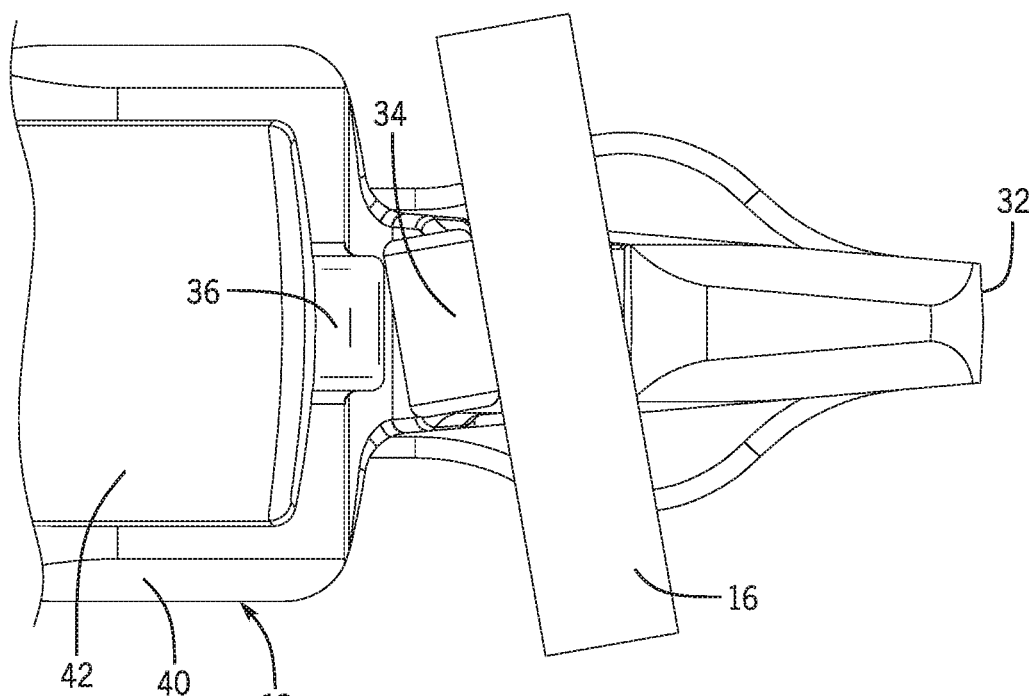
FIG. 22 is a detail side view of a portion of the clutching lamp adjuster assembly shown in FIG. 21 at the distal end of the retainer.

FIGS. 19-22 illustrate how the lamp mating panel 16 tilts as the retainer 18 is retracted (as shown in FIGS. 19-20) or extended (as shown in FIGS. 21-22). Notice that the retainer 18 does not rotate as it extends or retracts, but rather, maintains a substantially constant orientation, with the clutching opening 42 facing outwards. This orientation ensures that general usage loads will occur on the retainer sidewall 40, rather than on or opposite the clutching opening 42, which helps prevent dislodging. The mating geometry 24 of the lamp mating panel 16 ensures this constant orientation, preventing substantial twisting of the retainer 18.

In the present embodiment, the retainer 18 is caused to extend or retract by the interaction between the threaded section 28 of the base screw 20 and the retainer interface section 38 of the retainer 18 as the base screw 20 rotates. Here, when the base screw 20 rotates, the rotational energy translates through the rotationally fixed retainer 18 to the lamp mating panel 16, causing the lamp mating panel 16 to pivot. In this embodiment, when the retainer 18 is in a retracted position (as shown in FIGS. 19-20), the lamp mating panel 16 is tilted in a forward direction, whereas when the retainer 18 is in an extended position (as shown in FIGS. 21-22), the lamp mating panel 16 is tilted in a rearward direction.

Figure 23:
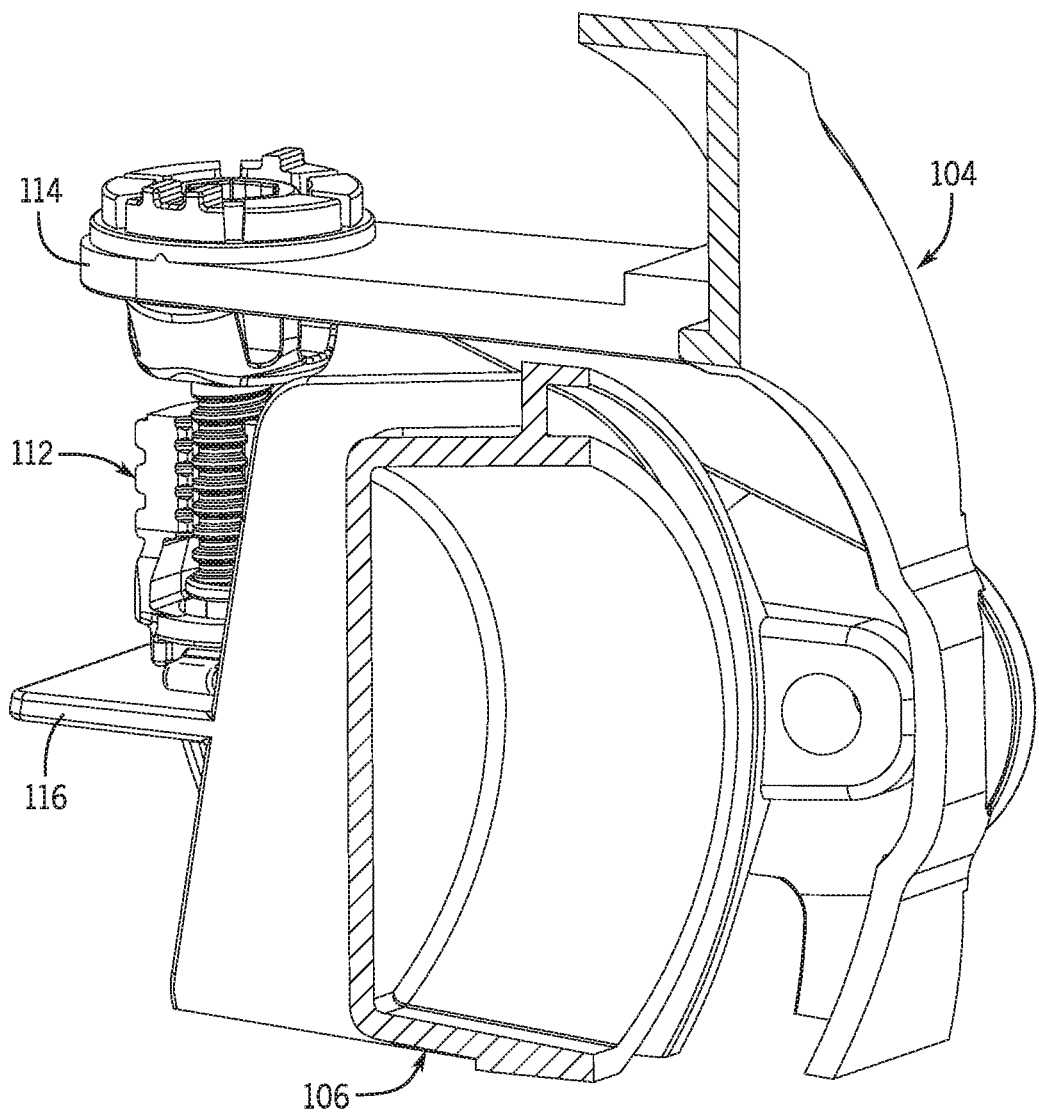
FIG. 23 is a perspective view of a clutching lamp adjuster assembly according to a second embodiment of the present disclosure including a clutching lamp adjuster and portions of a housing, and a lamp heat sink.
Figure 24:
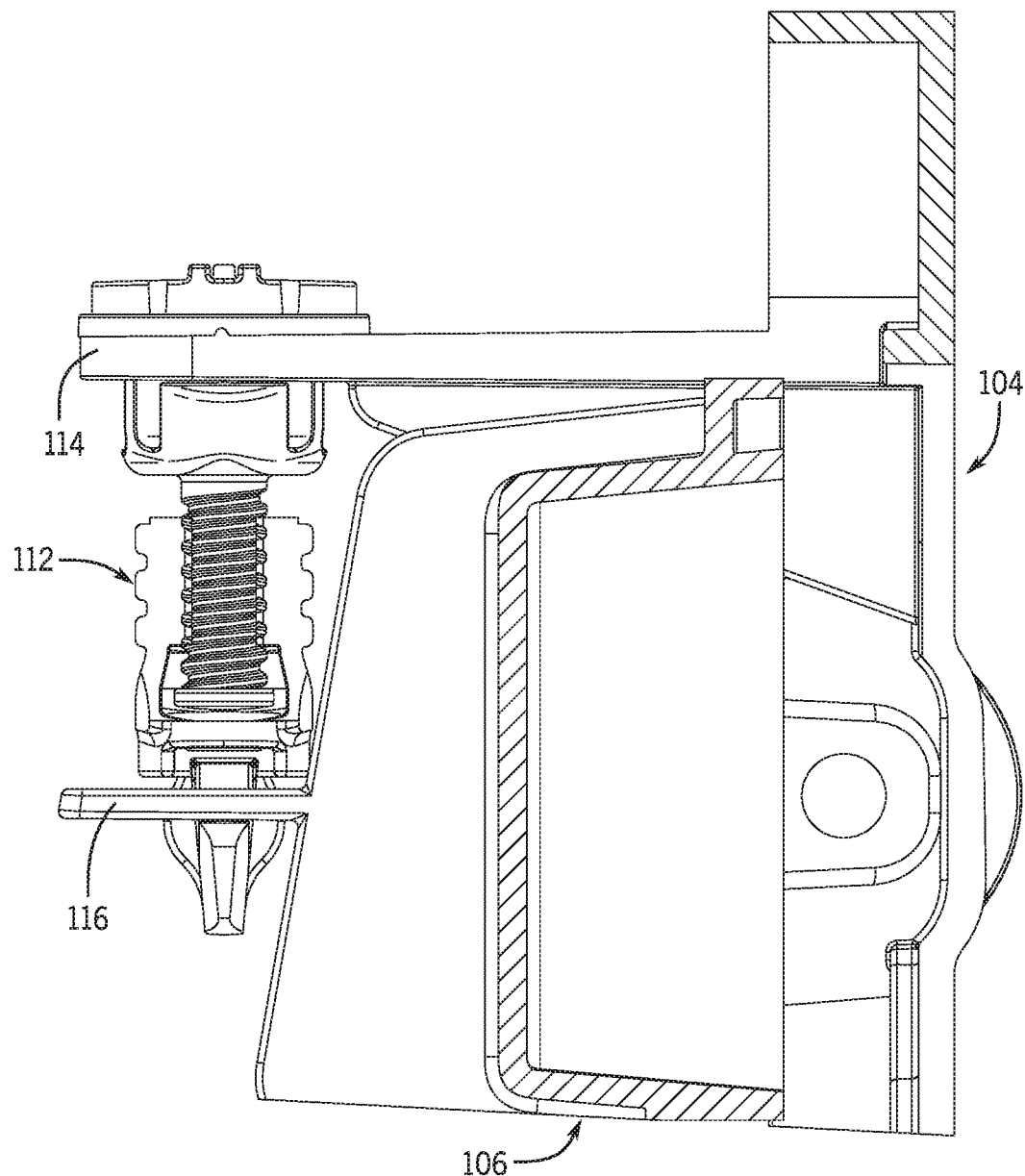
FIG. 24 is a side view of the clutching lamp adjuster assembly shown in FIG. 23.

FIGS. 23-24 show a clutching fog lamp adjuster assembly 110 according to a second embodiment of the present disclosure, with expanded views of a lamp housing 104 and a lamp heat sink 106 shown. A housing mating portion 114 is attached to the housing 104, and a lamp mating portion 116 is attached to the lamp heat sink 106. In this embodiment, the housing mating portion 114 is formed as a part of the housing 104 and the lamp mating panel 116 is formed as a part of the lamp heat sink 106, although other means of attachment could be implemented. Additionally, while the lamp mating panel 116 is shown in this embodiment to resemble a flat panel, in other embodiments, the mating portion of the lamp heat sink may take on other shapes. In the present embodiment, the clutching lamp adjuster 112 connects to both the housing 104, at the housing mating portion 114, and to the lamp heat sink 106, at the lamp mating panel 116.

Figure 25:
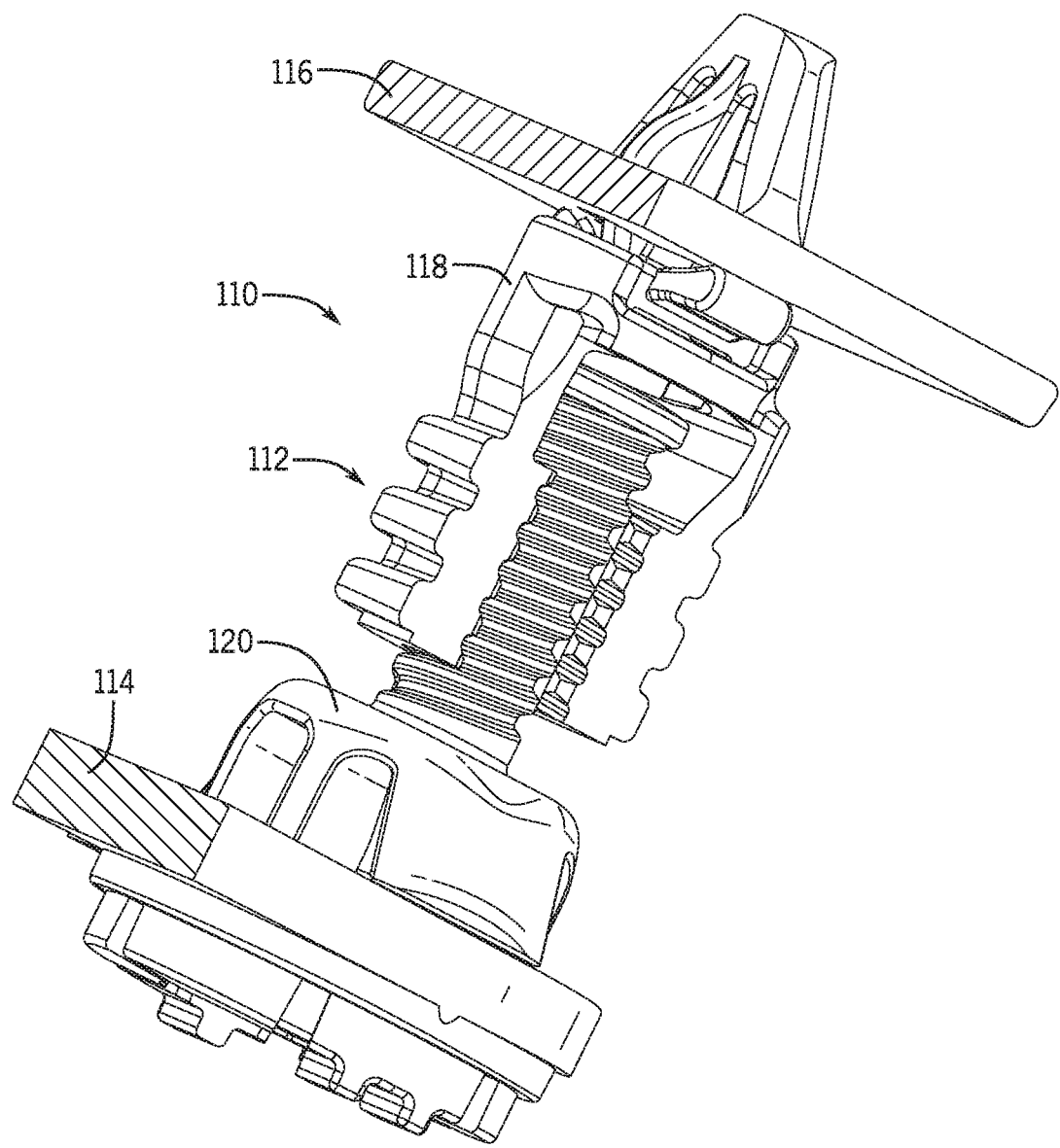
FIG. 25 is a perspective view of the clutching lamp adjuster assembly of FIG. 23, showing the clutching lamp adjuster, the mating portion of the housing, and the mating panel of the lamp heat sink, with the remainder of the housing and of the lamp heat sink removed for clarity.
Figure 26:
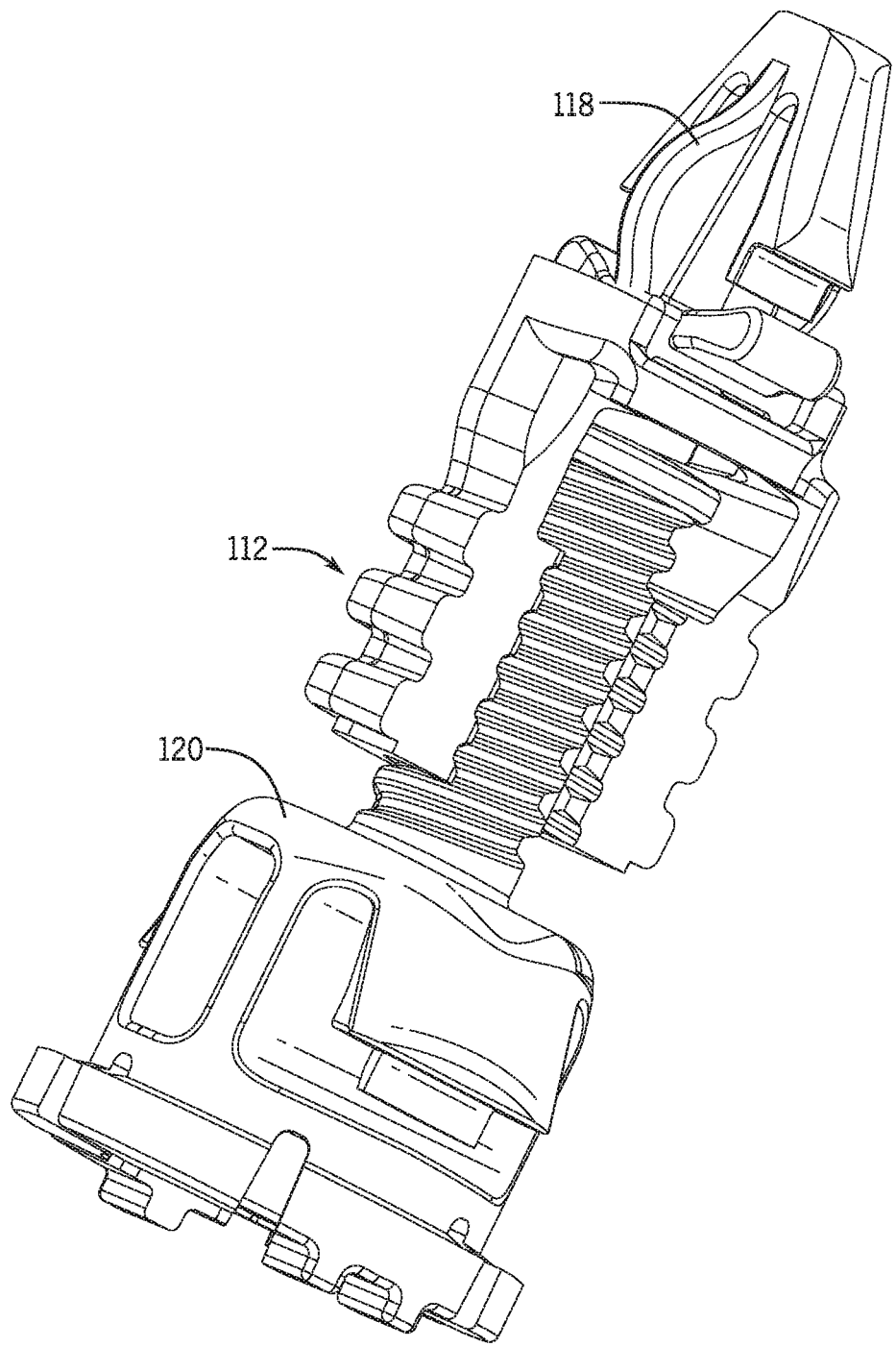
FIG. 26 is a perspective view of the clutching lamp adjuster of the clutching lamp adjuster assembly shown in FIG. 25 including a base screw and a retainer.

FIG. 25 shows the clutching lamp adjuster assembly 110 including the clutching lamp adjuster 112, the housing mating portion 114, and the lamp mating panel 116. The remainder of the housing 104 and lamp heat sink 106 are removed for clarity in this and the remaining figures. In this embodiment, the adjuster 112 mates with the housing mating portion 114 at a housing mating end, and with the lamp mating panel 116 at an opposing, retainer mating end. FIG. 26 shows the adjuster 112 in greater detail, with the housing mating portion 114 and the lamp mating panel 116 removed. In the present embodiment, the adjuster 112 includes a base screw 120 and a retainer 118 that screws or snaps onto the base screw 120.

Figure 27:
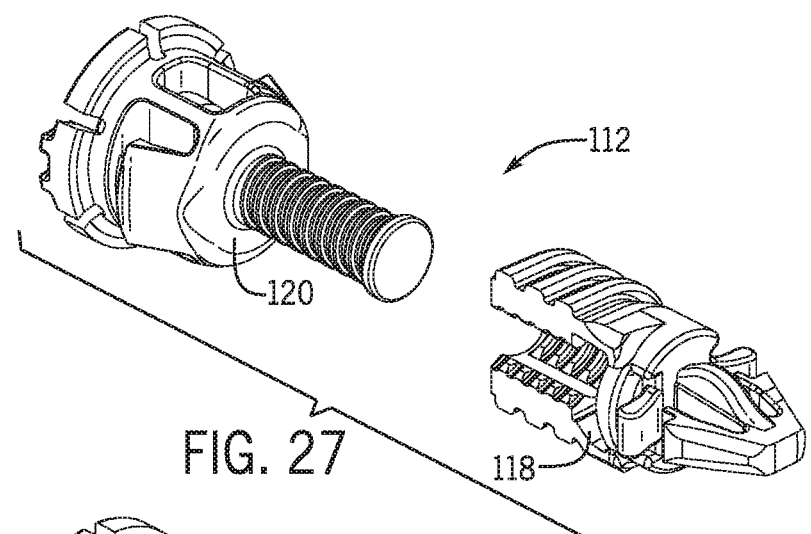
FIG. 27 is an exploded side perspective view of the clutching lamp adjuster shown in FIG. 26.
Figure 28:
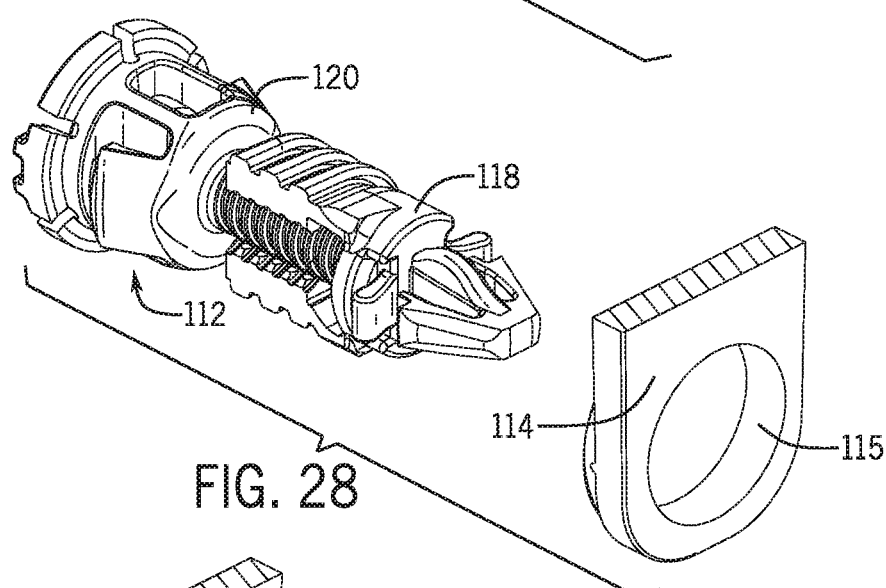
FIG. 28 is an exploded side perspective view of the clutching lamp adjuster assembly shown in FIG. 25 with the lamp mating panel removed for clarity, showing the clutching lamp adjuster as an assembled unit, and the housing mating portion, as a separate element, yet to be assembled.
Figure 29:
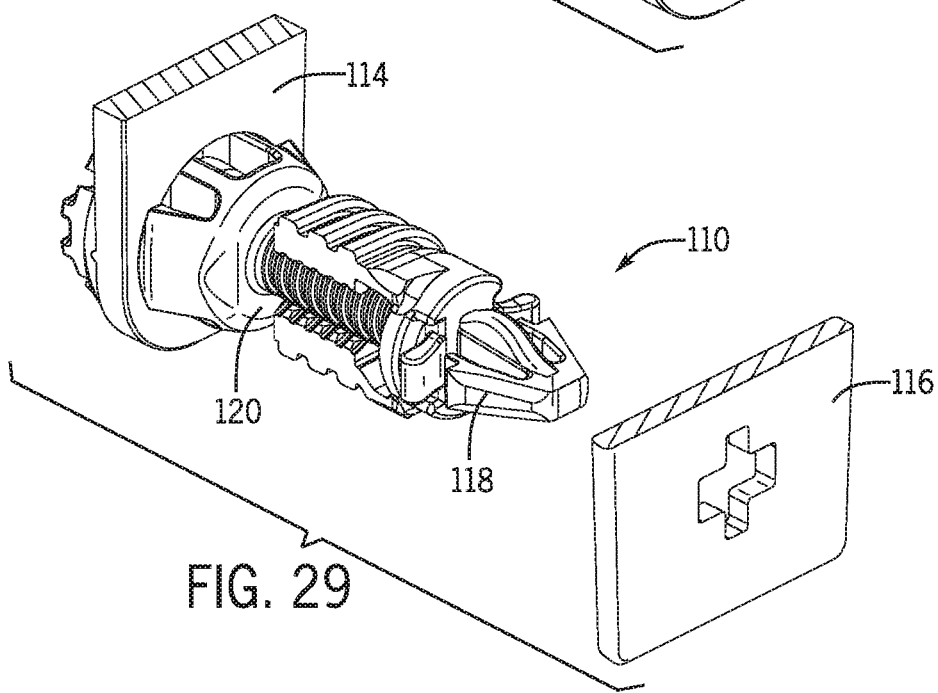
FIG. 29 is an exploded side perspective view of the clutching lamp adjuster assembly shown in FIG. 25 showing the clutching lamp adjuster and the housing mating portion together as an assembled unit, and the mating panel, as a separate element, yet to be assembled.

FIGS. 27-29 show one manner of assembling the adjuster assembly 110. FIG. 27 is an exploded view of the adjuster 112. FIG. 28 shows the adjuster 112 fully assembled, with the retainer 118 snapped onto the base screw 120, before being mated with the housing mating portion 114. A sidewall 115 defines an opening in the housing mating portion 114, sized to permit the adjuster 112 to pass through the opening, beginning at the retainer mating end, until the opposing housing mating end is reached. At the housing mating end, the base screw 120 snaps into place against the sidewall 115, such that the base screw 120 may no longer move in a forward or a rearward direction through the housing mating portion 114, but may still rotate within the opening defined by the sidewall 115. Although the sidewall 115, in this embodiment, forms a substantially circular shape, the sidewall in other embodiments may form other shapes, corresponding to other mating ends of other base screws. Further, the present embodiment depicts an adjuster assembly 110 in which no seal is required between the housing mating portion 114 and the base screw 120. Therefore, an O-ring is not included in this embodiment. However, should a seal be desired between the housing mating portion 114 and the base screw 120, an O-ring, for instance an O-ring similar to the O-Ring 22 shown and described in the previous embodiment, may be included in this embodiment. FIG. 29 shows the adjuster 112 mated with the housing mating portion 114, but separated from the lamp mating panel 116. When fully assembled, the lamp mating panel 116 snaps into place at the retainer mating end of the adjuster 112.

Figure 30:
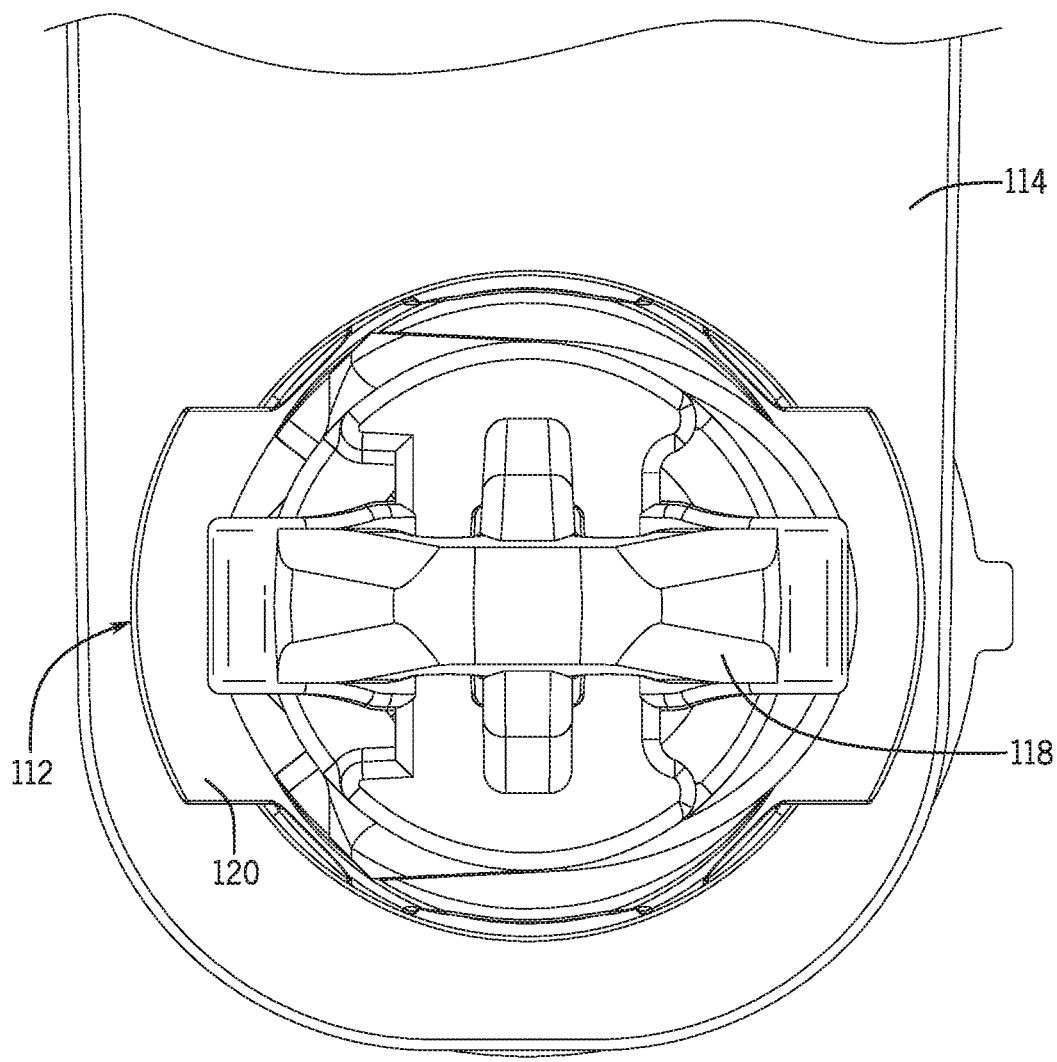
FIG. 30 is a top view of the clutching lamp adjuster assembly shown in FIG. 25 with the lamp mating panel removed for clarity.
Figure 31:
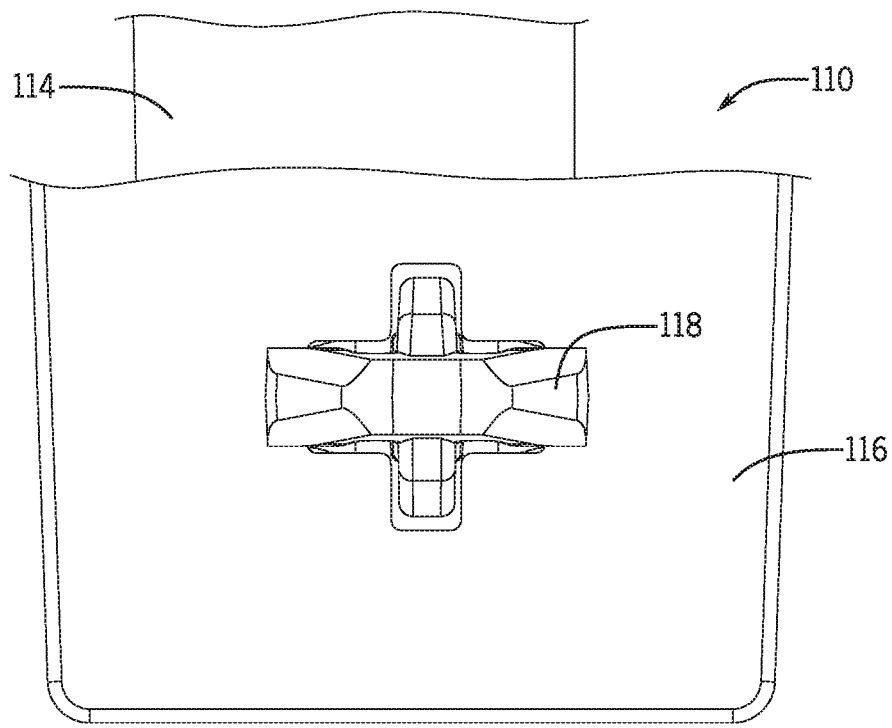
FIG. 31 is a top view of the clutching lamp adjuster assembly shown in FIG. 25.
Figure 32:
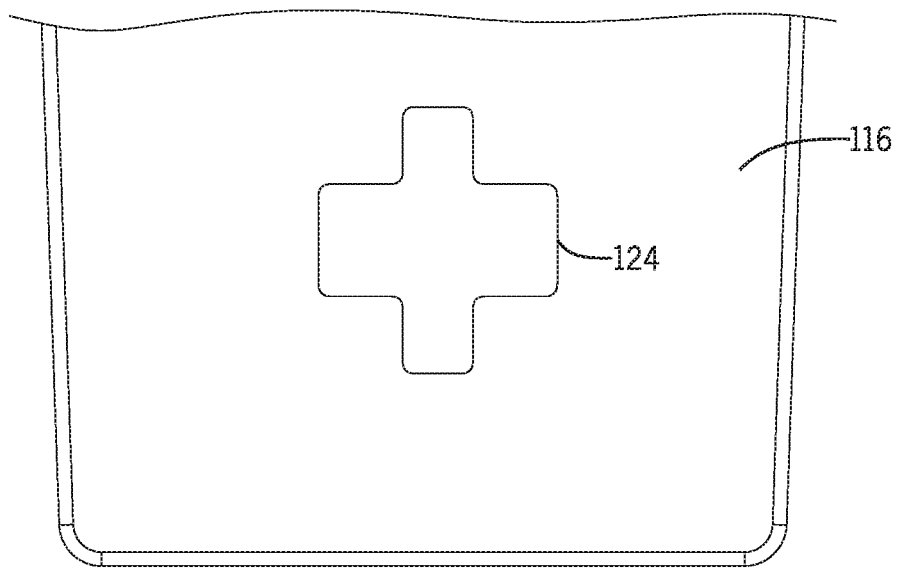
FIG. 32 is a top view of the lamp mating panel of the clutching lamp adjuster assembly shown in FIG. 25.

FIGS. 30-32 show top views of various elements of the adjuster assembly 110. FIG. 30 shows the adjuster 112 mated with the housing mating portion 114. The lamp mating panel 116 is not shown. FIG. 31 shows the complete adjuster assembly 110. And FIG. 32 shows only the lamp mating panel 116. In this embodiment, the mating geometry 124 is formed in the shape of a plus symbol. In other embodiments, the mating geometry may form other shapes, corresponding to other mating ends of other adjusters.

Figure 33:
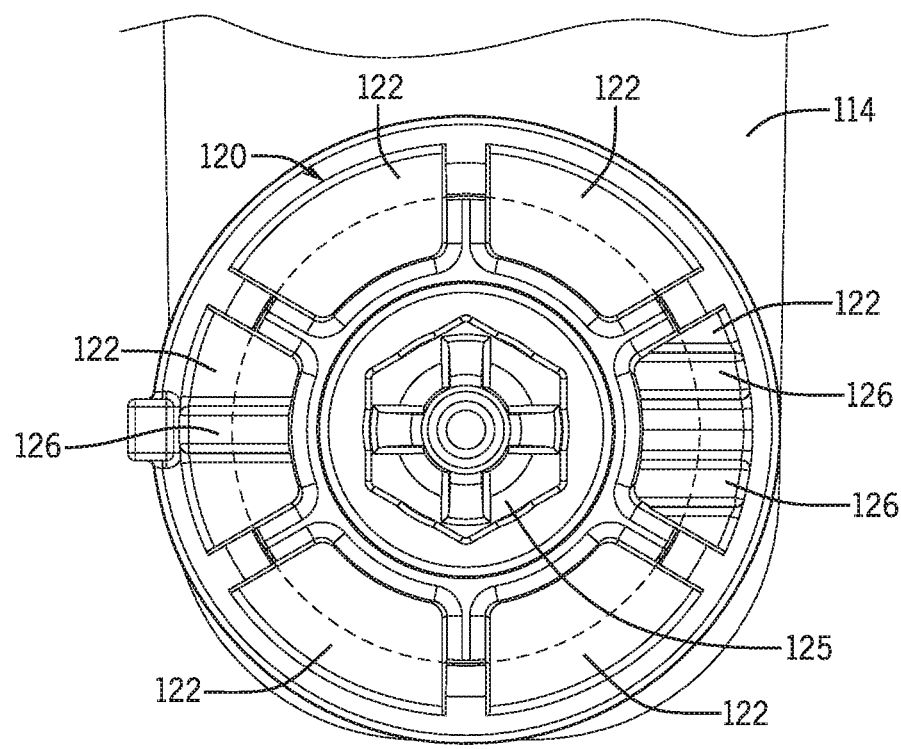
FIG. 33 is a bottom view of the clutching lamp adjuster assembly shown in FIG. 25.
Figure 34:
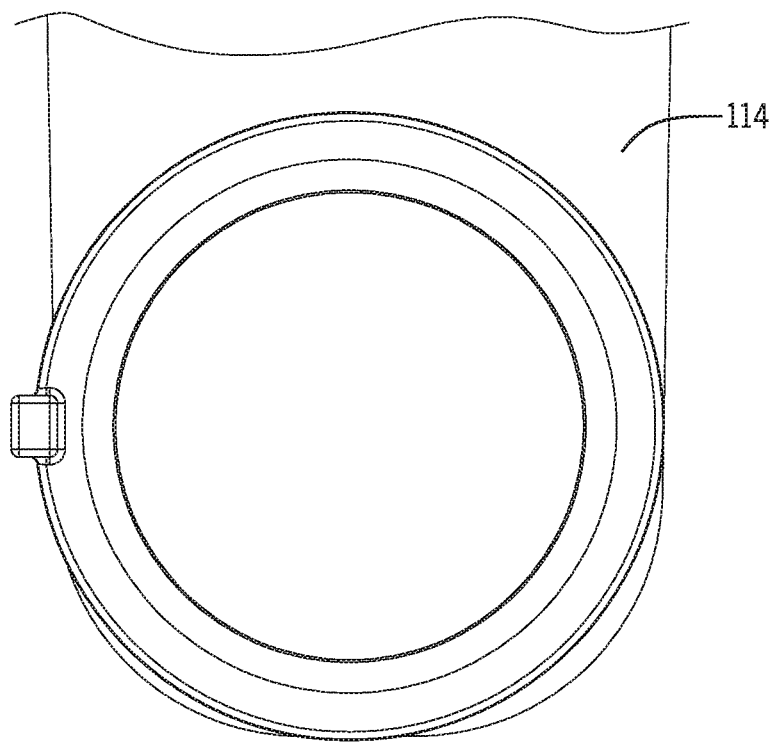
FIG. 34 is a bottom view of the housing mating portion of the clutching lamp adjuster assembly shown in FIG. 25.

FIGS. 33-34 respectively show bottom views of the adjuster assembly 110 and of the housing mating portion 114, alone. In the embodiment shown, a distal end of the base screw 120 includes a combination hexagonal-cross recessed interface 125, which allows for multiple component installation and adjustment options. However, in other embodiments, the distal end of the base screw 120 may include different forms of interfaces. The distal end of the base screw 120 may further include deformable fingers 122, which aid in securing the base screw 120 to the housing mating portion 114. As can be seen in FIG. 33, the deformable fingers 122 extend beyond the opening defined by the sidewall 115, such that the housing mating portion 114 may not be moved in a rearward direction beyond the deformable fingers 122. The deformable fingers 122 are sufficiently deformable to absorb system vibrations without breaking from the base screw 120, but maintain sufficient rigidity to prevent disconnection of the housing portion 114 from the base screw 120.

In this embodiment, the distal end of the base screw 120 additionally includes orientation tabs 126. The orientation tabs 126 allow an assembler to correctly orient the adjuster 112, even when the assembler cannot see beyond the housing mating portion 114, for instance, during a blind assembly. The embodiment shown in FIG. 33 includes two orientation tabs 126, and proper installation is signaled by a horizontal orientation of the orientation tabs 126. However, in other embodiments, a different number of orientation tabs may be utilized and proper orientation of the adjuster 112 may be signaled by a different orientation of the orientation tabs 126. Further, FIG. 34 shows the sidewall 115 extending continuously around the opening formed in housing mating portion 114. The continuity of the sidewall 115 may permit rotation of the base screw 120 within the housing mating portion 114.

Figure 35:
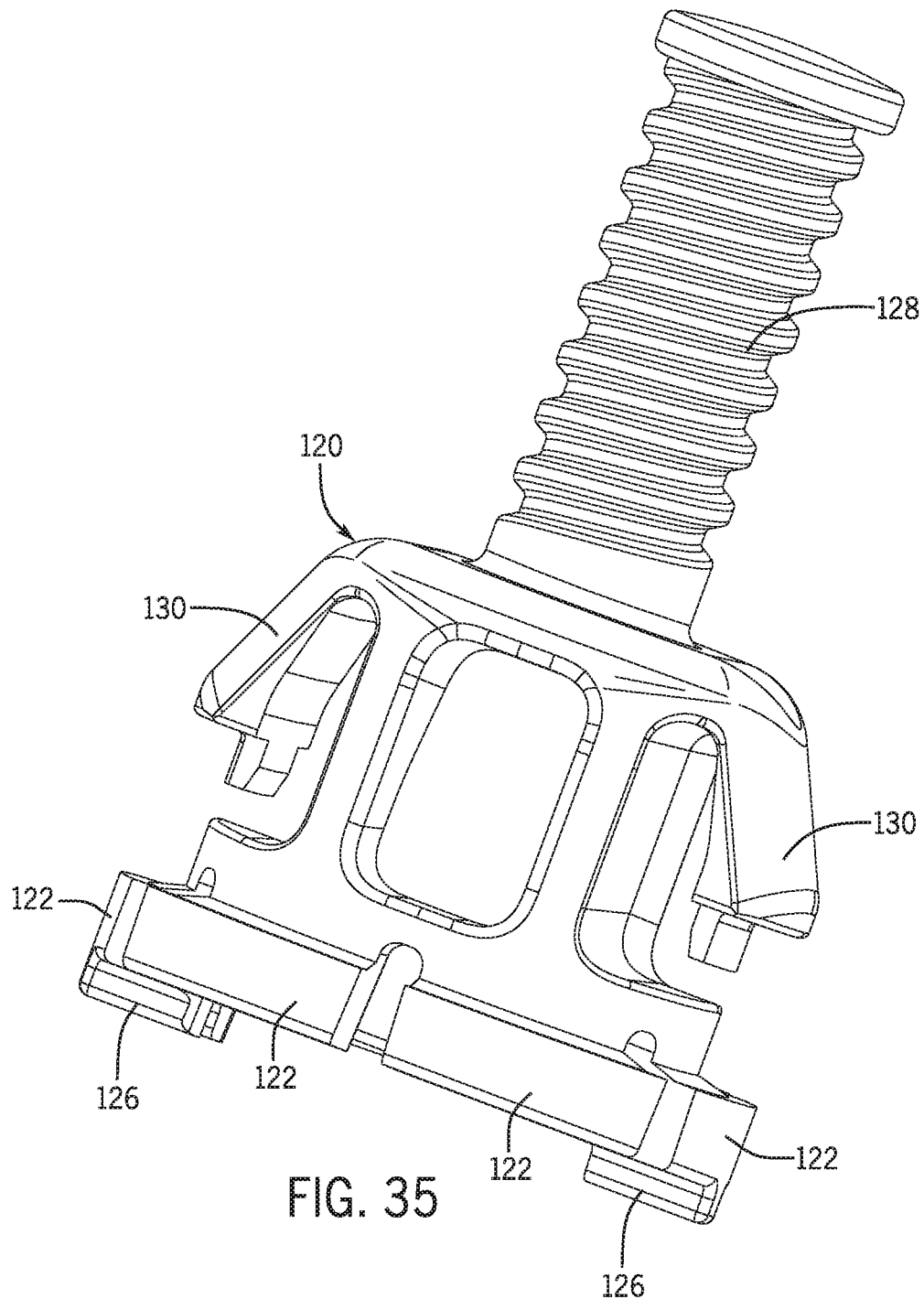
FIG. 35 is a perspective view of the base screw of the clutching lamp adjuster shown in FIG. 26.

FIG. 35 shows the base screw 120 in greater detail. The base screw 120 may include base screw snap fingers 130 that snap into the sidewall 115, contributing to a resilient, but rotatable mating connection with the housing mating portion 114. The base screw 120 may additionally include a threaded section 128, to which the retainer 118 connects. In an embodiment that does not include an O-Ring, an O-Ring channel, such as the O-Ring channel 23 shown in the previous embodiment, is no longer pertinent and may be eliminated from such an embodiment, which may decrease the overall length of the base screw. For instance, in FIG. 35, the base screw 120 is shown without an O-Ring channel, as this embodiment does not include an O-Ring. Should a seal be desired between the housing mating portion 114 and the base screw 120, the base screw 120 may include an O-Ring channel, which may support an O-Ring capable of forming the desired seal between the housing mating portion 114 and the base screw 120 when the housing mating portion 114 mates with the base screw 120.

Figure 36:
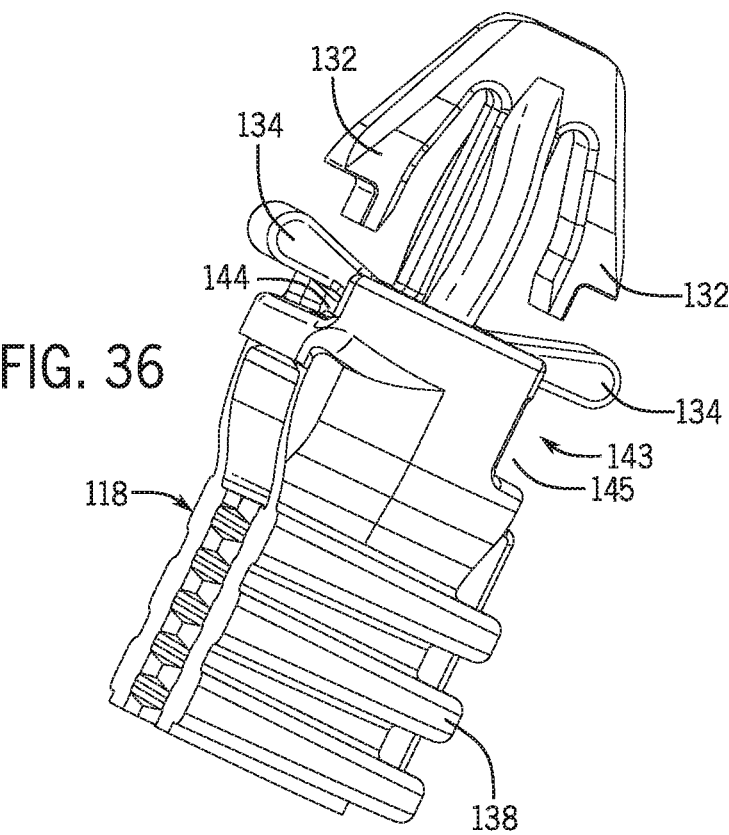
FIG. 36 is a perspective view of the retainer of the clutching lamp adjuster shown in FIG. 26.
Figure 37:
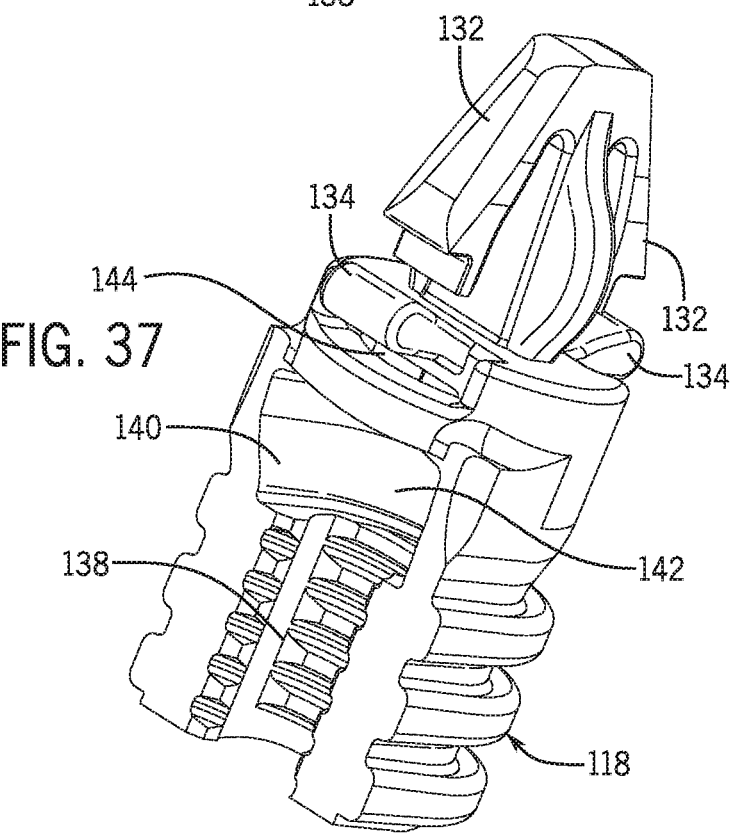
FIG. 37 is a rotated perspective view of the retainer shown in FIG. 36.
Figure 38:
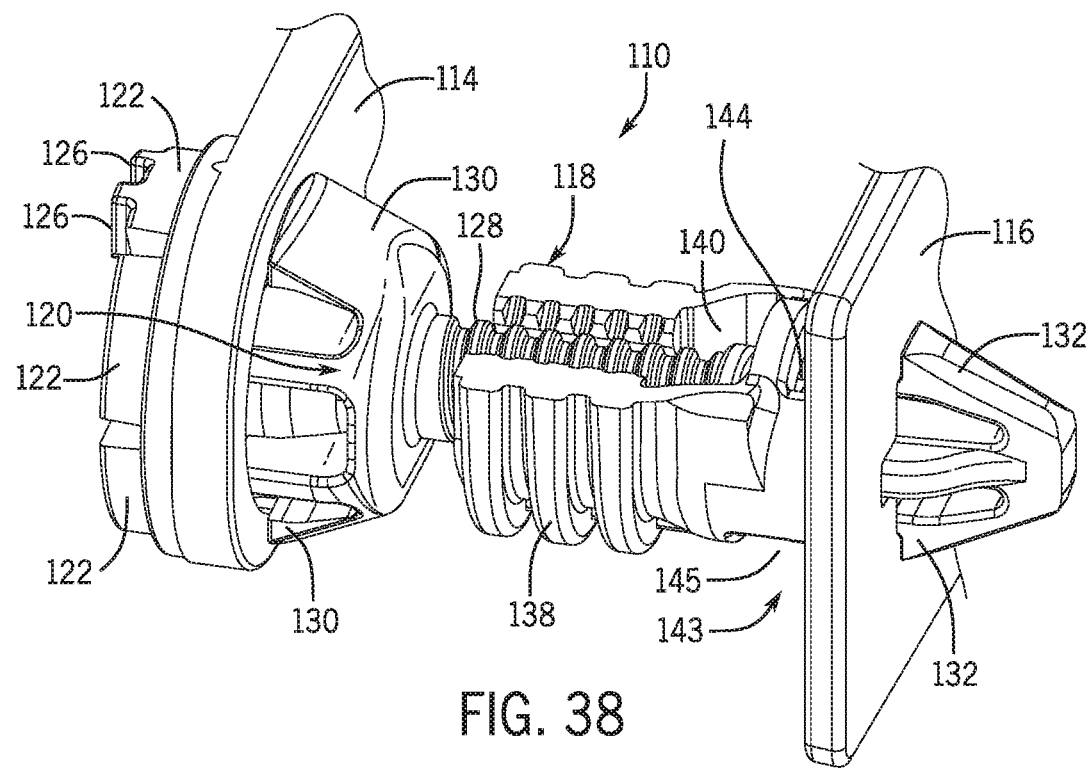
FIG. 38 is a front perspective view of the clutching lamp adjuster assembly shown in FIG. 25.

FIGS. 36-37 show the retainer 118 in greater detail. The retainer 118 includes a semicircular retainer sidewall 140. In the present embodiment, the retainer sidewall 140 defines a clutching opening 142. Above the clutching opening 142, a first pass core gap 144 may be defined in the retainer 118. The first pass core gap 144 may be sized to permit a limited amount of retainer spring finger 134 flexure, while maintaining sufficient retainer spring finger 134 structural strength and position within an adjustable travel length to avoid permanent deformation of the spring fingers 134. Opposite from and, at least in part aligned with, the first pass core gap 144, a second pass core gap 145 may be defined in the retainer 118. In this embodiment, the second pass core gap 145 is defined between the retainer interface section 138 and the retainer spring fingers 134. The second pass core gap 145 may be sized to provide room for additional snap finger 134 flexure. Together, the first pass core gap 144 and the second pass core gap 145 may form a pass core 143. The pass core 143, thus, may provide sufficient structure to maintain the mating function of the retainer spring fingers 134 and retainer snap fingers 132, while still allowing a sufficient level of retainer spring finger 134 flexure for installation and pivoting of the lamp mating portion 116.

Additionally, a portion of the retainer sidewall 140 may be threaded to form a retainer interface section 138, where the retainer 118 may interact with the threaded section 128 of the base screw 120. The unique composition of the retainer sidewall 140 allows for clutching at any point throughout travel. When the base screw 120 rotates in a manner that would not otherwise be permitted by the retainer interface section 138, rather than stripping the threaded section 128, the retainer sidewall 140 expands, widening the clutching opening 142 to an extent sufficient to permit slippage of the base screw 120 along the base screw interface 138 without significant damage to the threads of the threaded section 128 until the threaded section 128 once again fits properly within the retainer interface section 138, but not so far as to permit the threaded section 128 to dislodge from the retainer interface section 138. The pass core 143 is sized such that the retainer sidewall 140 maintains a sufficient degree of grip strength to prevent the base screw 120 from dislodging from the retainer 118. Integrated full-travel clutching provides a more robust adjustment solution for systems having increased weight and/or temperatures.

The retainer 118 additionally includes retainer snap fingers 132 to engage the lamp mating panel 116 and retainer spring fingers 134 to secure the connection to the lamp mating panel 116. In the embodiment shown, there are two retainer snap fingers 132 and two retainer spring fingers 134, each retainer spring finger 134 located directly below a respective retainer snap finger 132. In other embodiments, there may be a greater number of retainer snap fingers 132 and/or retainer spring fingers 134. Direct engagement of the retainer 118 with the lamp mating panel 116 eliminates the need for installation of a secondary mating socket, simplifying assembly and reducing component count.

In this embodiment, both the retainer snap fingers 132 and the retainer spring fingers 134 are made of an elastic material. Securing the lamp mating panel 116 between multiple, elastic elements, versus a single element or small number of rigid elements, allows the adjuster assembly 110 both to withstand greater system vibrations with decreased likelihood of damage or dislodging, and to accommodate lamp mating panels, or equivalent lamp mating elements, of various thicknesses without requiring higher installation forces or creating a loose joint. This embodiment does not include travel restriction lugs as shown in the previously described embodiment, but travel restriction lugs could be included if desired.

Figure 39:
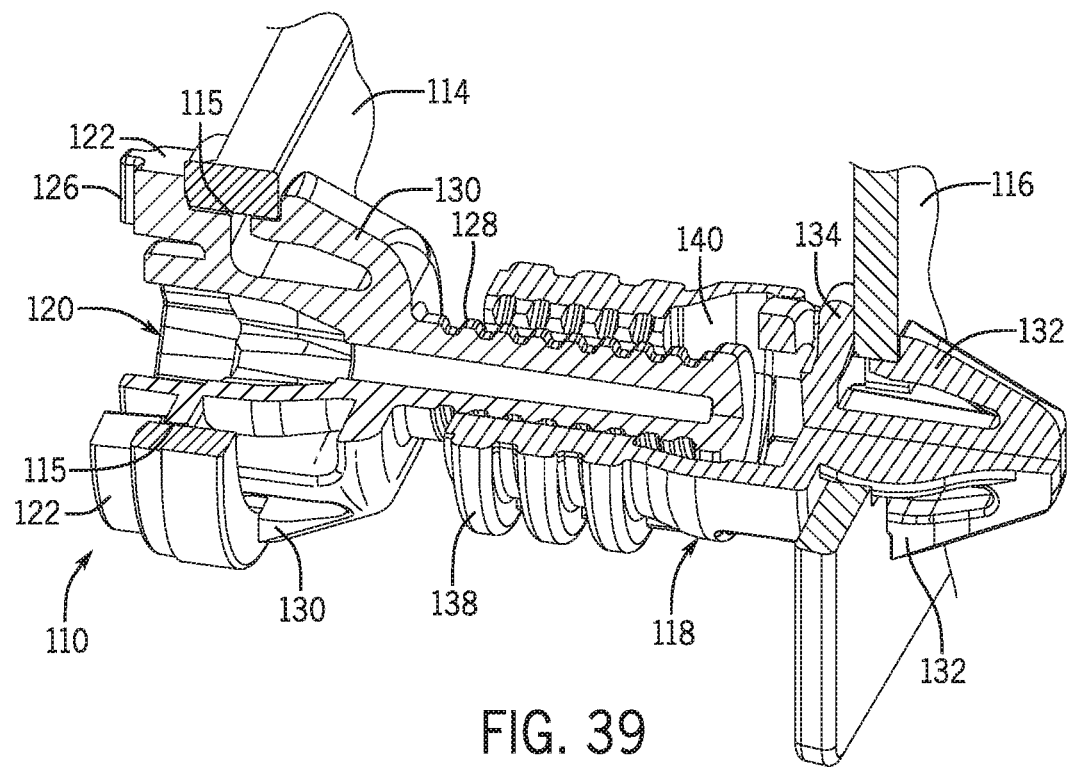
FIG. 39 is a front perspective cutaway view of the clutching lamp adjuster assembly shown in FIG. 25.
Figure 40:
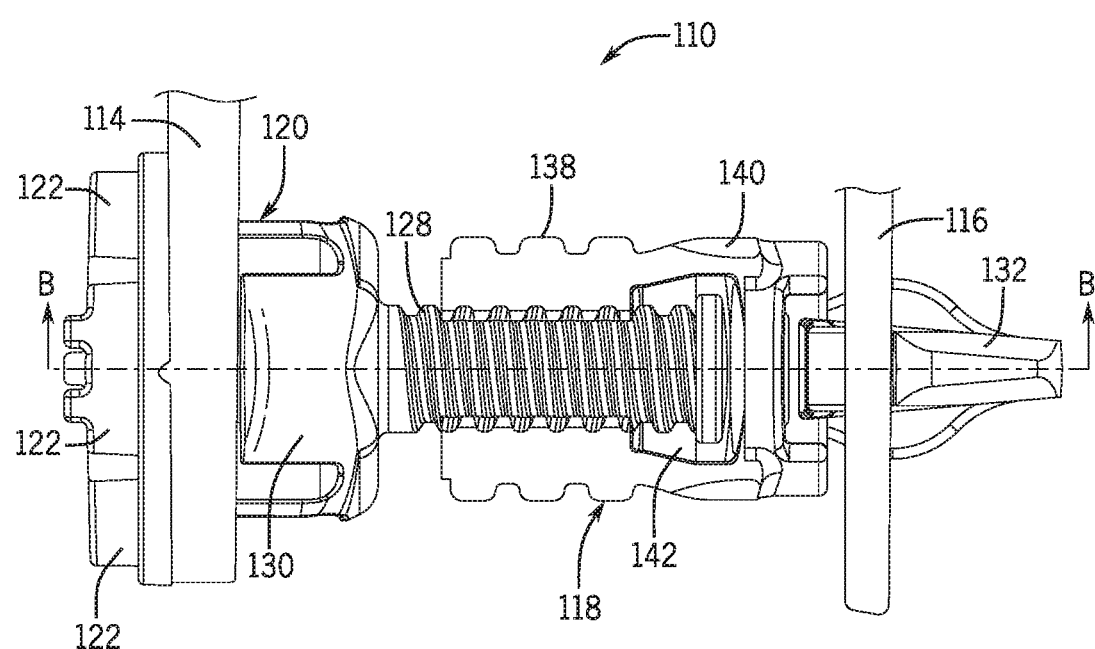
FIG. 40 is a side view of the clutching lamp adjuster assembly shown in FIG. 25 with the retainer in a neutral position.
Figure 41:
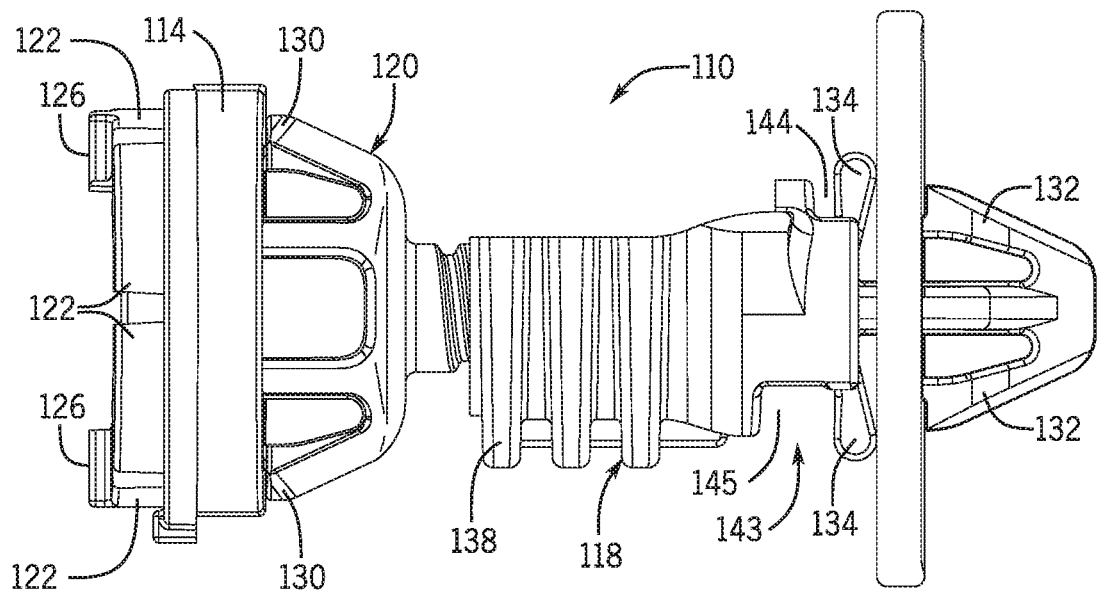
FIG. 41 is a front view of the clutching lamp adjuster assembly of FIG. 40.
Figure 42:
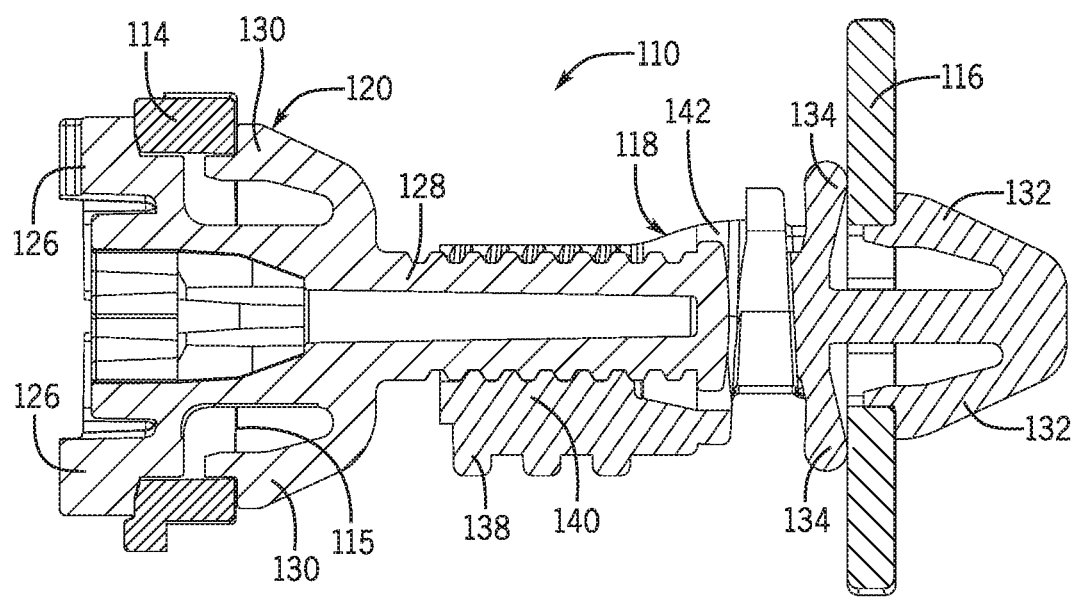
FIG. 42 is a cross-sectional front view of the clutching lamp adjuster assembly shown in FIG. 40, taken along the line B-B in FIG. 40.

FIGS. 38-42 show the various components of the full adjuster assembly 110 interacting with one another. For instance, the cutaway view in FIG. 39 shows housing mating portion 114 locked in place between the deformable fingers 122 and base screw snap fingers 130, as well as showing the lamp mating panel 116 locked in place by the retainer snap fingers 132 and further secured by the retainer spring fingers 134, also shown in the cross-sectional view in FIG. 42. Further, the custom fit of the retainer mating end within the mating geometry 124 (shown in FIG. 32) helps control insertion location, promoting proper retainer 118 orientation, and aids in limiting unwanted vibration. Additionally, the ability to connect the mating end of the retainer 118 directly to the lamp mating panel 116 of the lamp heat sink 106, due to the mating geometry 124 (shown in FIG. 32), eliminates the need for additional mating components, such as a secondary mating component, simplifying the adjuster assembly 110.

Figure 43:
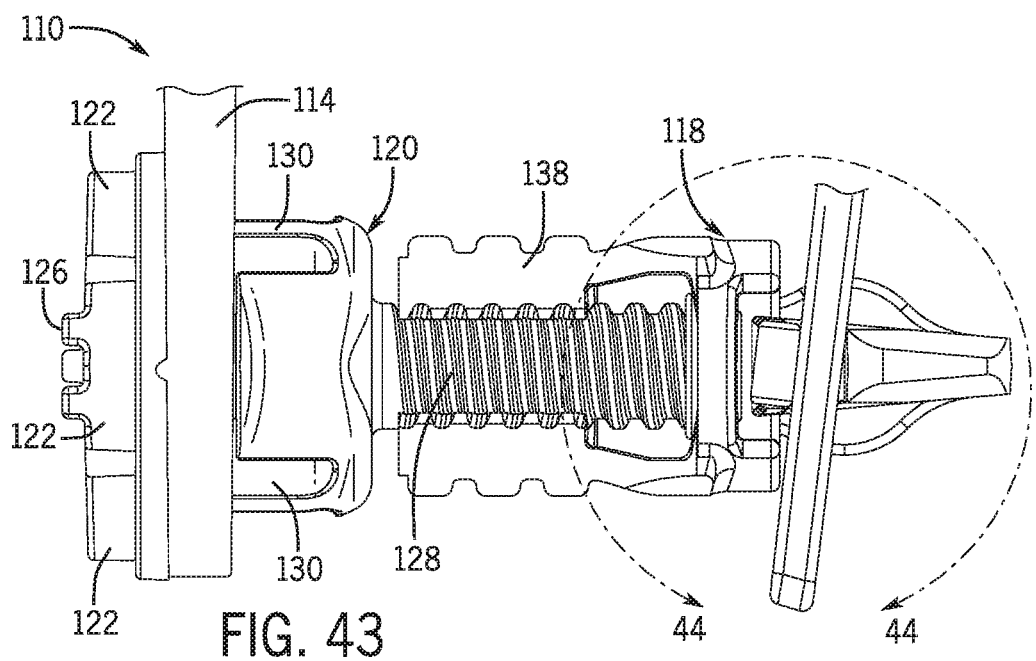
FIG. 43 is a side view of the clutching lamp adjuster assembly shown in FIG. 40 with the retainer in a retracted position.
Figure 44:
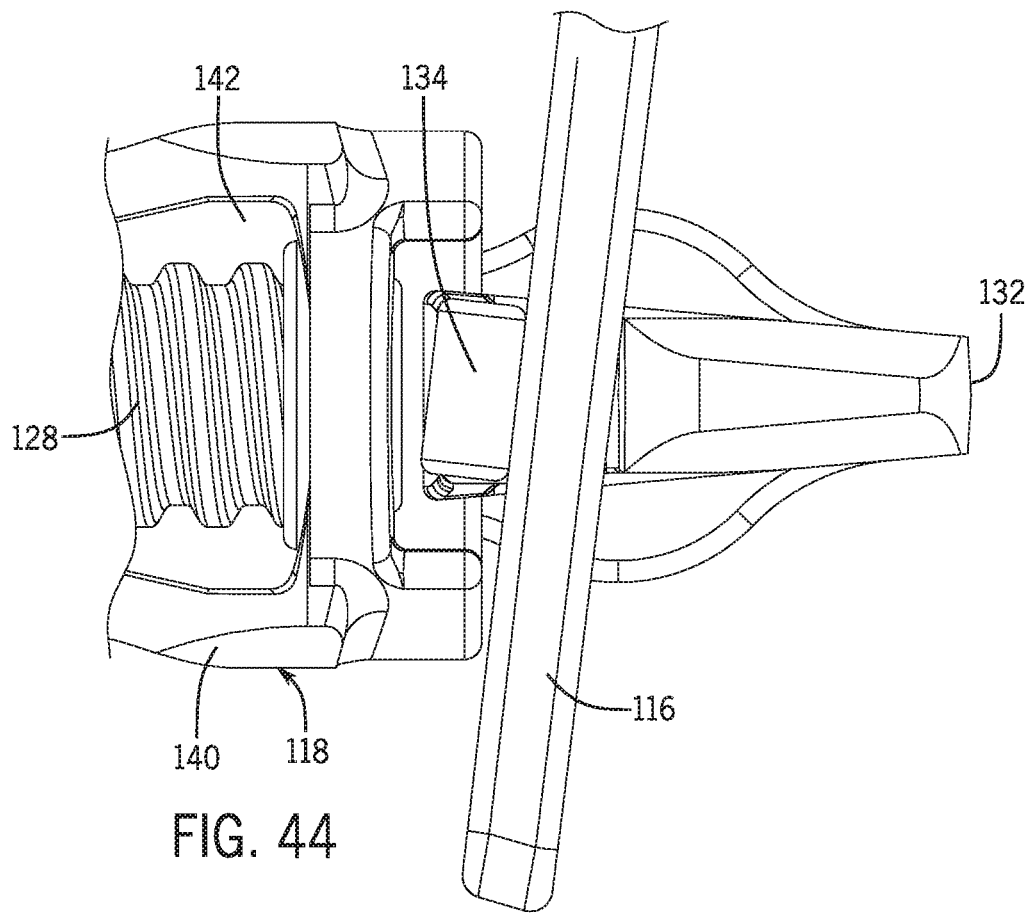
FIG. 44 is a detail side view of a portion of the clutching lamp adjuster assembly shown in FIG. 43 at the distal end of the retainer.
Figure 45:
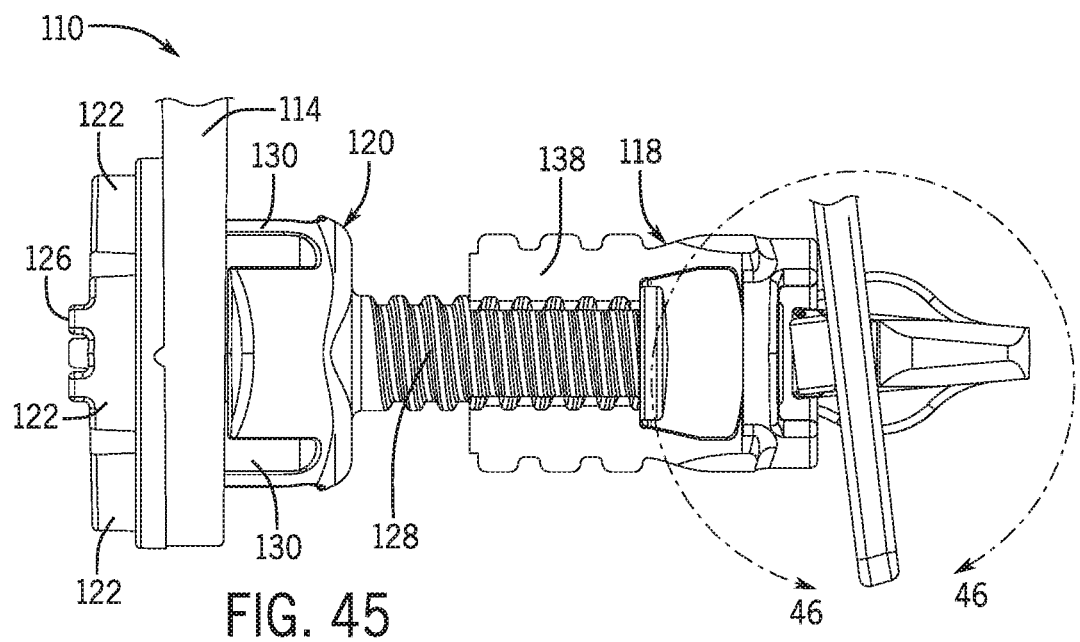
FIG. 45 is a side view of the clutching lamp adjuster assembly shown in FIG. 40 with the retainer in an extended position.
Figure 46:
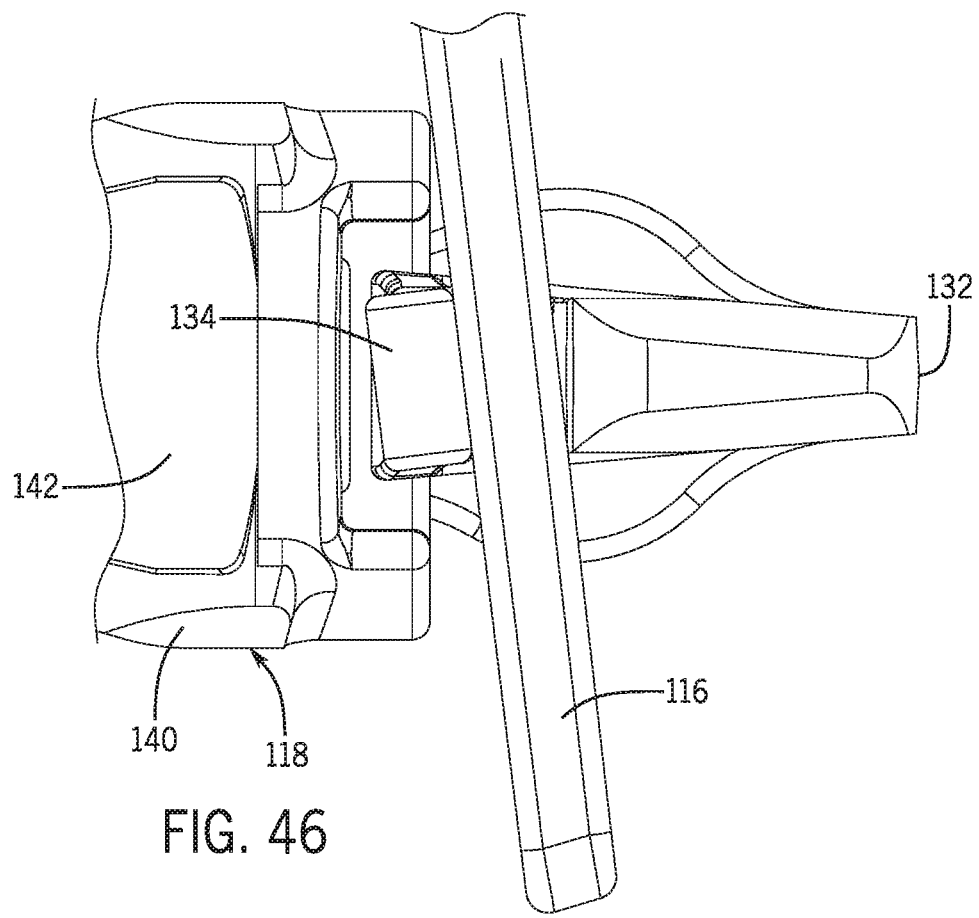
FIG. 46 is a detail side view of a portion of the clutching lamp adjuster assembly shown in FIG. 45 at the distal end of the retainer.

FIGS. 43-46 illustrate how the lamp mating panel 116 tilts as the retainer 118 is retracted (as shown in FIGS. 43-44) or extended (as shown in FIGS. 45-46). Notice that the retainer 118 does not rotate as it extends or retracts, but rather, maintains a substantially constant orientation, with the clutching opening 142 facing outwards. This orientation ensures that general usage loads will occur on the retainer sidewall 140, rather than on or opposite the clutching opening 142, which helps prevent dislodging. The mating geometry 124 of the lamp mating panel 116 ensures this constant orientation, preventing substantial twisting of the retainer 118.

In the present embodiment, the retainer 118 is caused to extend or retract by the interaction between the threaded section 128 of the base screw 120 and the retainer interface section 138 of the retainer 118 as the base screw 120 rotates. Here, when the base screw 120 rotates, the rotational energy translates through the rotationally fixed retainer 118 to the lamp mating panel 116, causing the lamp mating panel 116 to pivot. In this embodiment, when the retainer 118 is in a retracted position (as shown in FIGS. 43-44), the lamp mating panel 116 is tilted in a forward direction, whereas when the retainer 118 is in an extended position (as shown in FIGS. 45-46), the lamp mating panel 116 is tilted in a rearward direction.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. An adjuster for adjustable automotive lamps, the adjuster comprising:
    a base screw including a threaded shaft; and
    a retainer connected to the threaded shaft, the retainer comprising:
    a semicircular sidewall, partially surrounding at least a portion of the threaded shaft, the semicircular sidewall having interior threads that correlate to the threads of the threaded shaft, and the semicircular sidewall defining a clutching opening that permits expansion of the semicircular sidewall when the threaded shaft slips with respect to the interior threads;
    a plurality of retainer snap fingers located proximate to a distal end of the retainer and configured to mate to a lamp mating portion of the adjustable automotive lamp; and
    a plurality of retainer spring fingers positioned within such proximity to the plurality of retainer snap fingers as to further secure the lamp mating portion against substantial sliding movement along the adjuster after the plurality of retainer snap fingers mates with the lamp mating portion;
    wherein the retainer snap fingers and retainer spring fingers move relative to the semicircular sidewall.

2. The adjuster of claim 1, wherein the base screw further comprises a plurality of base screw snap fingers configured to mate to a housing mating portion of a lamp housing in a manner that permits rotation of the base screw with respect to the housing mating portion.

3. The adjuster of claim 2, wherein the base screw further comprises an O-Ring coaxially affixed to base screw, the O-Ring configured to form a seal between the base screw and the housing mating portion when the base screw mates to the housing mating portion.

4. The adjuster of claim 2, wherein the base screw further comprises a deformable finger positioned at a distal end of the base screw within such proximity to the plurality of base screw snap fingers as to further secure the housing mating portion against substantial longitudinal sliding movement after the plurality of snap fingers mates with the housing mating portion.

5. The adjuster of claim 4, wherein the deformable finger elastically deforms sufficiently to absorb system vibrations without breaking from the base screw during use.

6. The adjuster of claim 5, wherein the semicircular sidewall further comprises an unthreaded portion positioned between the interior threads and the spring fingers, and wherein the unthreaded portion defines a gap opposite, at least in part, to the clutching opening.

7. An adjuster assembly for adjustable automotive lamps, the adjuster assembly comprising:
    a housing mating portion connected to a lamp housing;
    a lamp mating portion forming part of the adjustable automotive lamp; and
    a lamp adjuster connected to both the housing mating portion and the lamp mating portion, the lamp adjuster comprising:
    a base screw mated to the housing mating portion, the base screw including a threaded shaft; and
    a retainer connected to the threaded shaft, the retainer comprising:
        a semicircular sidewall, partially surrounding at least a portion of the threaded shaft, the semicircular sidewall having a series of interior threads that correlate to threads of the threaded shaft, and the semicircular sidewall defining a clutching opening that permits expansion of the semicircular sidewall when the threaded shaft slips with respect to the interior threads;
        a plurality of retainer snap fingers located proximate to a distal end of the retainer and mated to the lamp mating portion; and
        a plurality of retainer spring fingers positioned within such proximity to the plurality of retainer snap fingers as to secure the lamp mating portion against substantial longitudinal movement;
        wherein the retainer snap fingers and retainer spring fingers move relative to the semicircular sidewall.

8. The adjuster assembly of claim 7, wherein the lamp mating portion includes lamp mating geometry configured to restrict rotation of the retainer with respect to the lamp mating portion while permitting pivoting of the lamp mating portion with respect to the retainer.

9. The adjuster assembly of claim 8, wherein the lamp mating geometry comprises a plus shape.

10. The adjuster of claim 9, wherein the base screw further comprises a plurality of base screw snap fingers configured to mate to the housing mating portion.

11. The adjuster assembly of claim 10, wherein the housing mating portion includes housing mating geometry configured to permit rotation of the base screw with respect to the housing mating portion.

12. The adjuster of claim 11, wherein the base screw further comprises a deformable finger positioned at a distal end of the base screw within such proximity to the plurality of base screw snap fingers as to secure the housing mating portion against longitudinal movement.

13. The adjuster of claim 12, wherein the deformable finger elastically deforms sufficiently to absorb system vibrations without breaking from the base screw during use.

14. The adjuster of claim 11 wherein the base screw further comprises an O-Ring, affixed around the base screw at the location where the base screw mates with the housing mating portion, the O-Ring forming a seal between the base screw and the housing mating portion.

15. The adjuster assembly of claim 7, wherein the lamp mating portion comprises a panel.

16. A lamp adjuster for adjustable automotive lamps, the adjuster comprising:
- a base screw comprising:
  - a threaded shaft;
  - a plurality of base screw snap fingers configured to mate to a housing mating portion of a lamp housing in a manner that permits rotation of the base screw with respect the housing mating portion;
  - a securement mechanism configured to secure the housing mating portion against substantial longitudinal movement after the plurality of snap fingers mates with the housing mating portion; and
  - an orientation tab located on a distal end of the base screw, configured to signal proper orientation of the lamp adjuster to a user installing the lamp adjuster; and
- a retainer connected to the threaded shaft, the retainer comprising:
  - a semicircular sidewall, partially surrounding at least a portion of the threaded shaft, the semicircular sidewall having a series of interior threads that correlate to the threads of the threaded shaft, and the semicircular sidewall defining a clutching opening that permits expansion of the semicircular sidewall when the threaded shaft slips with respect to the interior threads;
  - a pair of opposing retainer snap fingers located proximate to a distal end of the retainer and configured to mate to a lamp mating panel of an automotive lamp heat sink in a manner that fixes the retainer against rotation; and
  - a pair of opposing retainer spring fingers positioned within such proximity to the plurality of retainer snap fingers as to secure the lamp mating portion against substantial longitudinal movement along the length of the adjuster after the plurality of snap fingers mates with the lamp mating portion;
  - wherein the retainer snap fingers and retainer spring fingers move relative to the semicircular sidewall.

17. The lamp adjuster of claim 16, wherein the securement mechanism comprises a deformable finger positioned at a distal end of the base screw and positioned within such proximity to the plurality of base screw snap fingers as to secure the housing mating portion.

18. The lamp adjuster of claim 17, wherein the semicircular sidewall further comprises an unthreaded portion positioned between the interior threads and the spring fingers, and wherein the unthreaded portion defines a gap opposite, at least in part, the clutching opening.

19. The lamp adjuster of claim 16, wherein the securement mechanism comprises an O-Ring affixed around the base screw at the location where the base screw mates with the housing mating portion.

20. The lamp adjuster of claim 19, further comprising a pair of travel restriction lugs positioned on an opposing side of the retainer spring fingers from the retainer snap fingers, each travel restriction lug of the pair of travel restriction lugs positioned sufficiently proximate to the pair of spring fingers to prevent overextension of each respective spring finger of the pair of spring fingers.

* * * * *